(12) United States Patent
Hong et al.

(10) Patent No.: US 12,264,087 B2
(45) Date of Patent: Apr. 1, 2025

(54) FILTRATION APPARATUS AND CONTROL METHOD THEREOF

(71) Applicant: SAMSUNG ELECTRONICS CO., LTD., Suwon-si (KR)

(72) Inventors: Jongsoo Hong, Suwon-si (KR); Doyoon Kim, Suwon-si (KR); Hojin Lee, Suwon-si (KR); Byoungwoo Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 427 days.

(21) Appl. No.: 17/804,574

(22) Filed: May 30, 2022

(65) Prior Publication Data

US 2023/0035630 A1  Feb. 2, 2023

Related U.S. Application Data

(63) Continuation of application No. PCT/KR2022/006794, filed on May 12, 2022.

(30) Foreign Application Priority Data

Jul. 30, 2021  (KR) .................. 10-2021-0100984

(51) Int. Cl.
- *C02F 1/32* (2023.01)
- *C02F 1/00* (2023.01)
- *E03B 7/07* (2006.01)

(52) U.S. Cl.
CPC ............... *C02F 1/32* (2013.01); *C02F 1/008* (2013.01); *E03B 7/074* (2013.01); *C02F 2201/326* (2013.01)

(58) Field of Classification Search
None
See application file for complete search history.

(56) References Cited

U.S. PATENT DOCUMENTS

| 4,775,794 A | 10/1988 | Behmann |
| 10,603,395 B2 | 3/2020 | Ochi et al. |

(Continued)

FOREIGN PATENT DOCUMENTS

| CN | 107337238 B | 10/2022 |
| EP | 0505125 A2 | 9/1992 |

(Continued)

OTHER PUBLICATIONS

International Search Report and Written Opinion of the International Searching Authority dated Aug. 26, 2022, in connection with International Application No. PCT/KR2022/006794, 11 pages.

(Continued)

*Primary Examiner* — Chester T Barry

(57) ABSTRACT

A filtration apparatus includes a flow path, a valve provided on the flow path, a first light source configured to emit a first light including ultraviolet (UV) light toward the flow path, a second light source configured to emit a second light including visible light or infrared light toward the flow path, a first optical sensor located out of a path of the first light and the second light, electrodes provided on the flow path, and a processor electrically coupled to the valve, the first light source, the second light source, the first optical sensor, and the electrodes. The processor is configured to alternately operate the first light source and the second light source, receive a first signal from the first optical sensor while the first light source emits the first light, and control the valve and the electrodes to sterilize the flow path based on the first signal.

19 Claims, 20 Drawing Sheets

(56) References Cited

U.S. PATENT DOCUMENTS

| | | | |
|---|---|---|---|
| 2001/0004962 | A1 | 6/2001 | Hirota et al. |
| 2015/0336810 | A1 | 11/2015 | Smetona et al. |
| 2018/0362367 | A1 | 12/2018 | Mahdjoubi Namin et al. |
| 2019/0300391 | A1* | 10/2019 | Shatalov .................. C02F 1/30 |

FOREIGN PATENT DOCUMENTS

| | | |
|---|---|---|
| JP | H-10128318 A | 5/1998 |
| JP | 4322636 B2 | 9/2009 |
| JP | 6675287 B2 | 4/2020 |
| KR | 10-0124664 B1 | 9/1997 |
| KR | 10-0728600 B1 | 6/2007 |
| KR | 20080056284 A | 6/2008 |
| KR | 10-1053572 B1 | 7/2011 |
| KR | 20130074105 A | 7/2013 |
| KR | 10-1909003 B1 | 10/2018 |
| KR | 20200034232 A | 3/2020 |
| KR | 20200129276 A | 11/2020 |
| KR | 10-2300426 B1 | 9/2021 |

OTHER PUBLICATIONS

Supplementary European Search Report dated May 24, 2024, in connection with European Patent Application No. 22849683.2, 7 pages.

\* cited by examiner

FILTRATION APPARATUS AND CONTROL METHOD THEREOF

CROSS-REFERENCE TO RELATED APPLICATIONS

This application is a bypass continuation of International Application No. PCT/KR2022/006794, filed on May 12, 2022, which is based on and claims priority under 35 U.S.C. § 119 to Korean Patent Application No. 10-2021-0100984, filed on Jul. 30, 2021, in the Korean Intellectual Property Office, the disclosures of which are incorporated by reference herein in their entirety.

BACKGROUND

1. Field

The disclosure relates to a filtration apparatus and a control method thereof, and more particularly, to a filtration apparatus capable of interacting with a user and a control method thereof.

2. Description of Related Art

A filtration apparatus is a device that provides drinking water to a user by removing harmful substances contained in source liquid such as tap water or groundwater by using various purification methods such as precipitation, filtration, and sterilization. For example, the filtration apparatus may be provided such that one or more filtration filters filter the introduced liquid so as to supply clean liquid to the user.

Based on its shape, the filtration apparatus is classified into a direct-connection type that is directly connected to a faucet, and a storage type that puts liquid in a container and passes the liquid through a filter. In addition, the filtration apparatus may be classified into a natural filtration type, a direct filtration type, an ion exchange resin type, a distillation type, and a reverse osmosis type according to the filtration principle or method.

Liquid filtered by the filtration apparatus is discharged through a dispenser and may be used for drinking or cooking.

A conventional filtration apparatus cleans and/or sterilizes a flow path through which liquid passes at regular intervals. Due to cleaning and/or sterilization at regular intervals, cleaning and/or sterilization may be performed unnecessarily frequently or may not be performed in a timely manner despite the cleaning and/or sterilization being required.

SUMMARY

Therefore, it is an aspect of the disclosure to provide a filtration apparatus capable of identifying a degree of contamination of filtered liquid caused by organic substances and a degree of contamination of filtered liquid caused by inorganic substances, and a control method thereof.

It is another aspect of the disclosure to provide a filtration apparatus capable of starting cleaning and/or sterilizing a flow path, through which liquid passes, based on a degree of contamination of filtered liquid caused by organic substances and a degree of contamination of filtered liquid caused by inorganic substances, and a control method thereof.

It is another aspect of the disclosure to provide a filtration apparatus capable of adjusting a duration of performing cleaning and/or sterilizing a flow path, through which liquid passes, based on a degree of contamination of filtered liquid caused by organic substances and a degree of contamination of filtered liquid caused by inorganic substances, and a control method thereof.

Additional aspects of the disclosure will be set forth in part in the description which follows and, in part, will be obvious from the description, or may be learned by practice of the disclosure.

In accordance with an aspect of the disclosure, a filtration apparatus includes a flow path, a valve provided on the flow path, a first light source configured to emit a first light including ultraviolet (UV) light toward the flow path, a second light source configured to emit a second light including visible light or infrared light toward the flow path, a first optical sensor located out of a path of the first light and the second light, electrodes provided on the flow path, and a processor electrically coupled to the valve, the first light source, the second light source, the first optical sensor, and the electrodes. The processor is configured to alternately operate the first light source to emit the first light and the second light source to emit the second light, receive a first signal from the first optical sensor while the first light source emits the first light, and control the valve and the electrodes to sterilize the flow path based on the first signal.

In accordance with another aspect of the disclosure, a control method of a filtration apparatus including a flow path, a valve provided on the flow path, and electrodes provided on the flow path, the control method thereof includes alternately operating a first light source configured to emit a first light including ultraviolet (UV) light toward the flow path and a second light source configured to emit a second light including visible light or infrared light toward the flow path, identifying a first signal corresponding an intensity of light received by a first optical sensor while the first light source emits the first light, and controlling the valve and the electrodes to sterilize the flow path based on the first signal.

In accordance with another aspect of the disclosure, a filtration apparatus includes a flow path, a filter provided on the flow path, at least one valve provided on the flow path, an electrolysis device provided on the flow path, a first light source configured to emit a first light including ultraviolet (UV) light, a second light source configured to emit a second light including visible light or infrared light, a first optical sensor, and a processor electrically coupled to the at least one valve, the electrolysis device, the first light source, the second light source, and the first optical sensor. The processor is configured to receive a first signal from the first optical sensor while the first light source emits the first light, and configured to control the at least one valve and the electrolysis device to sterilize the flow path based on a magnitude of the first signal being greater than a first reference value, and configured to receive a second signal from the second optical sensor while the second light source emits the second light, and configured to control the at least one valve to clean the flow path based on a magnitude of the second signal being greater than a second reference value.

Before undertaking the detailed description below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
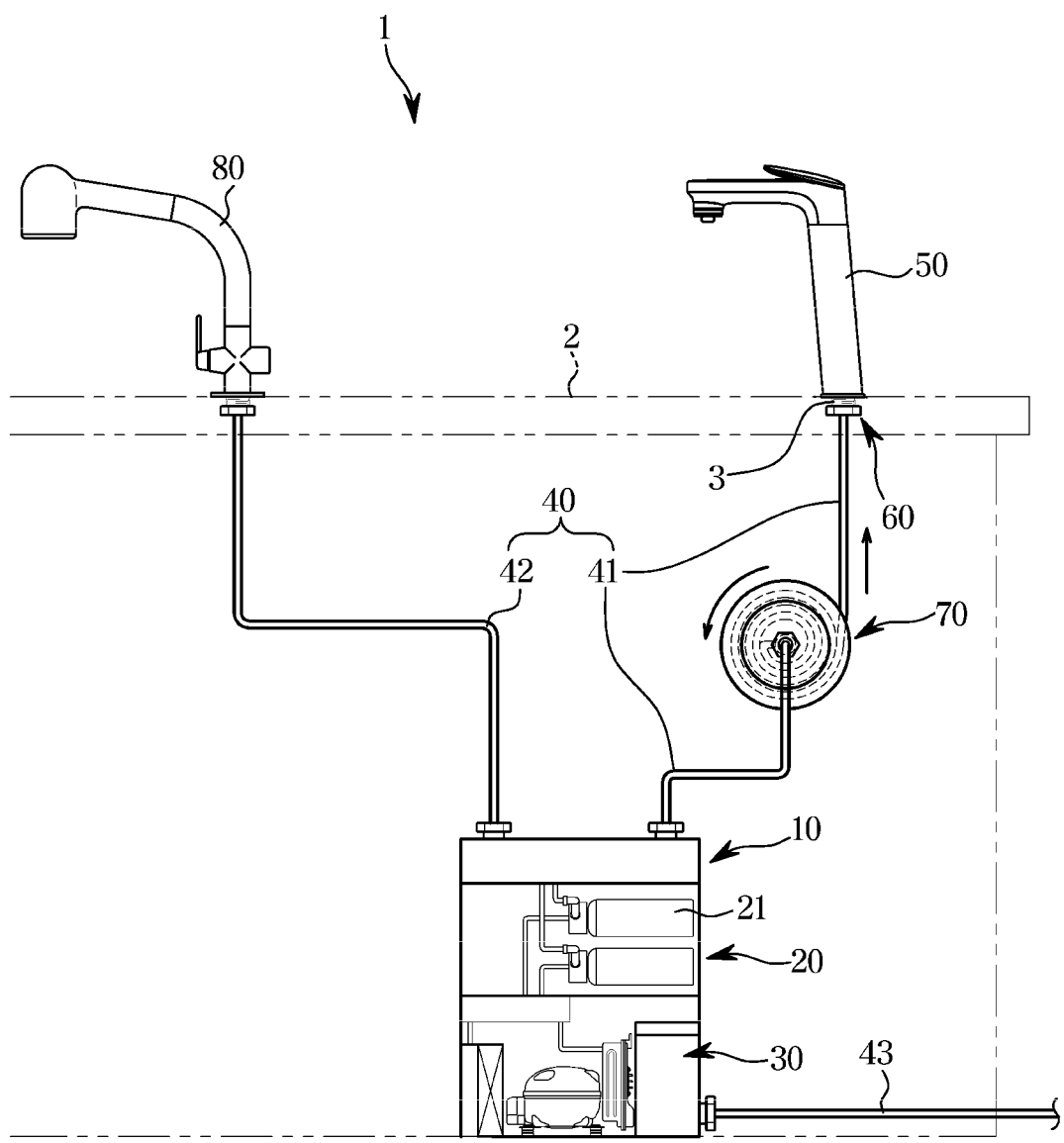
FIG. 1 is a view schematically illustrating a filtration apparatus according to various embodiments of the disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In the following description, like reference numerals refer to like elements throughout the specification. Well-known functions or constructions are not described in detail since they would obscure the one or more exemplar embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "coupled" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

Throughout the description, when a member is "on" another member, this includes not only when the member is in contact with the other member, but also when there is another member between the two members.

It will be understood that, although the terms first, second, third, etc., may be used herein to describe various elements, but is should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

Reference will now be made in detail to embodiments of the disclosure, examples of which are illustrated in the accompanying drawings.

FIG. 1 is a view schematically illustrating a filtration apparatus according to various embodiments of the disclosure.

Referring to FIG. 1, a filtration apparatus 1 may include a filtering body 10 and a dispenser 50 connected to the filtering body 10 to discharge liquid to the outside of the filtering body 10. The filtering body 10 may be arranged on a lower portion of a kitchen worktop 2, and the dispenser 50 may be arranged on an upper portion of the kitchen worktop 2. The kitchen worktop 2 may include a sink top. The sink top may include a sink and a kitchen countertop.

The dispenser 50 may be rotatably provided on the upper portion of the kitchen worktop 2. For example, the dispenser 50 may be rotatably installed on the top of the sink top. The dispenser 50 may be connected to the filtering body 10 through a connection pipe 40.

The filtering body 10 may be arranged inside the kitchen worktop 2. The filtering body 10 may include a filter unit 20 including at least one filter 21, and a heat exchange unit 30 to cool or heat the liquid filtered by the filter unit 20. The heat exchange unit 30 may include a cooler and a heater.

The filtering body 10 may receive source liquid such as tap water through an external pipe 43.

The filtering body 10 may include a first pipe 41 connecting the filtering body 10 to the dispenser 50, and a second pipe 42 connecting the filtering body 10 to a faucet 80 installed in the kitchen worktop 2.

An installation member 3 for installing the dispenser 50 may be provided in the kitchen worktop 2. The installation member 3 may be provided in an opening formed in at least a portion of the kitchen worktop 2. The dispenser 50 may be connected to the first pipe 41 through the installation member 3 of the kitchen worktop 2.

The dispenser 50 may be rotatably installed on the installation member 3. The filtration apparatus 1 may include a rotating member 60 provided to rotatably install the dispenser 50 to the installation member 3. The rotating member 60 may be coupled to the kitchen worktop 2.

The filtration apparatus 1 may include a pipe fixing member 70 provided to fix the pipes 41 and 42. The pipe fixing member 70 may be arranged inside the kitchen worktop 2. The pipe fixing member 70 may be arranged between the filtering body 10 and the dispenser 50. The pipe fixing member 70 may be fixed to at least one of the filtering body 10 and the kitchen worktop 2. A portion of the pipes 41 and 42 may be wound around the pipe fixing member 70, and as a portion of the pipes 41 and 42 is unwound or wound around the pipe fixing member 70, a length of the pipes 41 and 42 extending from the fixing member may be increased or reduced.

Figure 2:
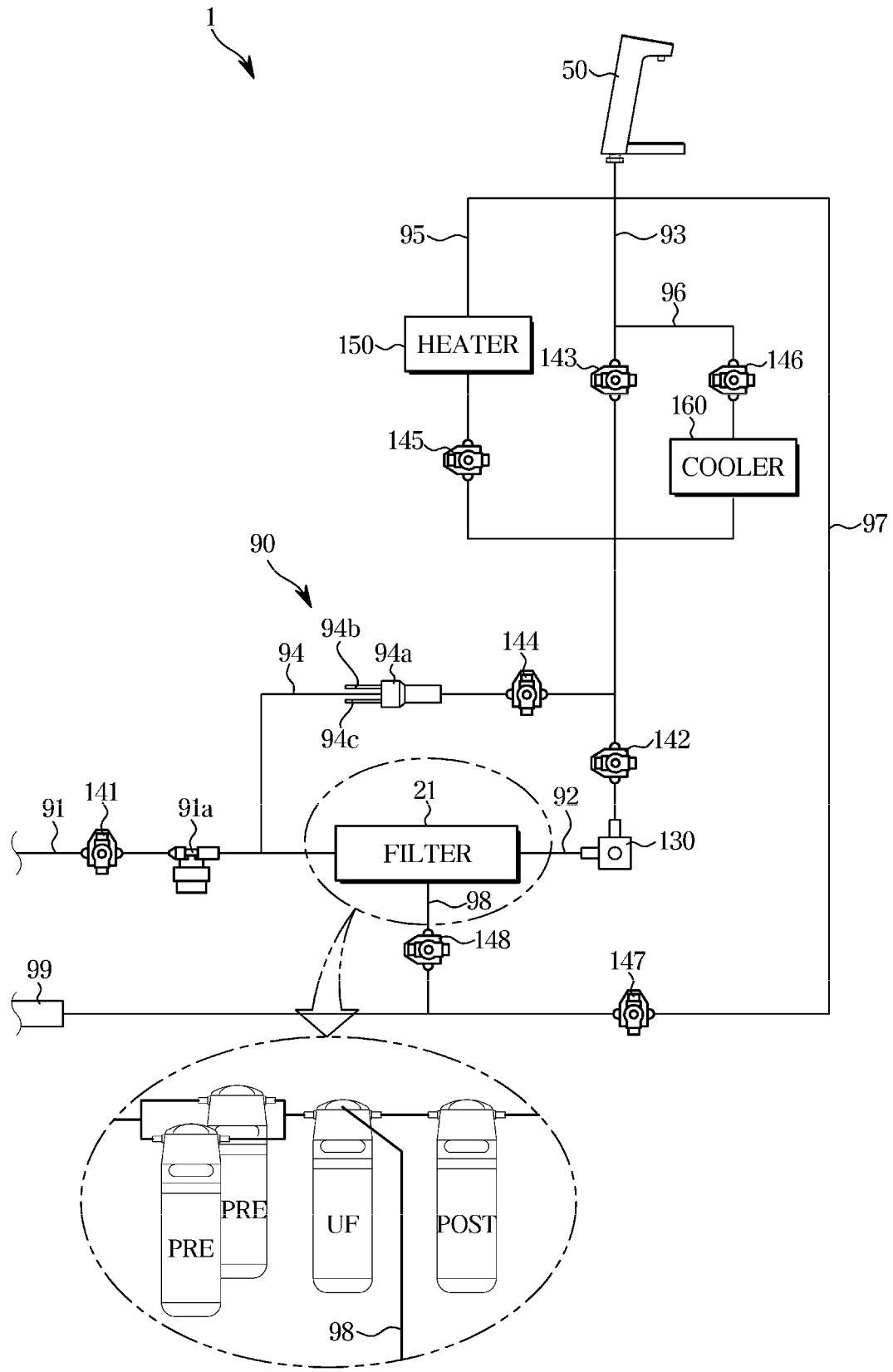
FIG. 2 is a view illustrating a flow path inside a filtering body of the filtration apparatus according to various embodiments of the disclosure.

FIG. 2 is a view illustrating a flow path inside the filtering body of the filtration apparatus according to various embodiments of the disclosure.

Referring to FIG. 2, a source path 91, through which source liquid such as tap water is introduced from the outside, filtered paths 92 and 93 extending from the source path 91 to the dispenser 50, or drain paths 97 and 98 branching from the filtered path 92 may be provided inside the filtering body 10. A filter 21 installed in the filtered paths 92 and 93 to filter the source liquid and a drain 99 provided to discharge the liquid in the filtration apparatus 1 to the outside may be provided in the filtering body 10. The flow paths provided in the filtration apparatus 1 may be formed by a plurality of pipes.

The source path 91 is connected to an external pipe 43 and thus the source liquid may be introduced into the source path 91. The source path 91 may include source valve 141 to regulate the inflow of the source liquid, and a regulator 91a to reduce a pressure of the source liquid.

According to various embodiments, the source path 91 may further include a sediment filter provided to filter out sediment contained in the source liquid or a high turbidity water filter provided to filter out relatively large particles.

The filtered paths 92 and 93 may include a first filtered path 92 and a second filtered path 93. The first filtered path 92 may be connected to the source path 91 so as to receive the source liquid from the source path 91 and may be connected to the second filtered path 93. The second filtered path 93 may extend to the dispenser 50.

The filter 21 filtering the source liquid may be provided in the first filtered path 92. The filter 21 may include a pre-carbon filter adsorbing volatile substances such as chlorine and chlorine by-products from the source liquid, a membrane filter filtering out relatively small contaminants by reverse osmosis pressure, and a post-carbon filter affecting a taste of the discharged liquid. In this case, the filter 21 may be connected in a sequence of the pre-carbon filter, the membrane filter, and the post-carbon filter, and the source liquid introduced into the filter 21 may be filtered while sequentially passing through the pre-carbon filter, the membrane filter, and the post-carbon filter.

The description of the filter type of the filter 21 may merely be an example applicable to the embodiment of the filtration apparatus 1, and embodiments of the filtration apparatus 1 are not limited to the above-described example. Accordingly, other types of filters other than the above-described examples may be provided in a different number and in a different arrangement.

A first filtered valve 142 may be provided downstream of the filter 21 to control the flow of the liquid filtered by the filter 21.

According to the embodiment of the filtration apparatus 1, the upstream and downstream and the front and rear ends are defined according to a direction in which the liquid introduced into the filtration apparatus 1 flows. A side close to a direction in which the source liquid flows from the outside is defined as the upstream or the front end, and a side close to a direction in which the source liquid is discharged or drained to the outside is defined as the downstream or rear end.

A flow sensor 130 may be provided in the first filtered path 92 to detect a flow rate in the first filtered path 92. For example, the flow sensor 130 may be provided downstream of the filter 21. The flow sensor 130 may detect a flow of liquid passing through the flow sensor 130 when the liquid passes through the flow sensor 130. For example, the liquid may be discharged through the dispenser 50 in response to the opening of the filtered valves 142 and 143. The flow sensor 130 may output an electrical signal (e.g., a current signal or a voltage signal) corresponding to the flow of the liquid passing through the flow sensor 130.

The filtration apparatus 1 may include a sterilizing solution path 94 that is provided to bypass the filter 21 and generates sterilizing solutions by processing the liquid. An end of the sterilizing solution path 94 may be connected to a downstream side of the regulator 91a, and the other end of the sterilizing solution path 94 may be connected to a downstream side of the first filtered valve 142. For example, the first filtered path 92 may be integrally connected with the source path 91, and the sterilizing solution path 94 may be bypassed from the source path 91. Accordingly, the source liquid may pass through at least one of the first filtered path 92 and the sterilizing solution path 94.

A sterilizing solution generator 94a may be provided in the sterilizing solution path 94 to generate sterilizing solutions and a sterilizing solution valve 144 may be provided in the sterilizing solution path 94 to control the inflow of the source liquid from the source path 91.

The sterilizing solution generator 94a may be implemented as an electrolysis device that generates sanitizing substances by electrolyzing liquid. For example, the sterilizing solution generator 94a may include a positive electrode 94b and a negative electrode 94c, and a voltage may be applied between the positive electrode 94b and the negative electrode 94c. At the negative electrode 94c, hydrogen ions contained in the liquid gain electrons to generate hydrogen molecules. At the positive electrode 94b, chlorine ions contained in the liquid lose electrons to generate chlorine molecules. Chlorine molecules generated at the positive electrode 94b combine with liquid molecules (e.g., water molecules) to generate hypochlorous acid (HOCl—), hydrogen ions, and chlorine ions. Hydrogen ions and chlorine ions may be converted into hydrogen molecules and chlorine molecules at the negative electrode and the positive electrode 94b, respectively. By the electrolysis by the positive electrode 94b and the negative electrode 94c, the concentration of hypochlorous acid (HOCl—) in the liquid may increase. In this case, hypochlorous acid (HOCl) may be used as a bleaching agent, an oxidizing agent, a deodorant, a sterilizing agent, etc. as a weak acid, and liquid containing hypochlorous acid (HOCl) may be used as sterilizing solutions.

However, the sterilizing solution generator 94a is not limited to the above example, and a known type of device may be included to generate sterilizing solutions. For example, an ultraviolet (UV) lamp or a light emitting diode (LED) lamp may be provided.

The filtration apparatus 1 may further include a hot/cold water device for providing cold water or hot water, and the cold/hot water device may include a heat exchanger. The cold/hot water device may be provided downstream of the first filtered path 92.

The first filtered path 92 may be branched into the second filtered path 93, a hot water path 95, and a cold water path 96 at the downstream of the first filtered valve 142.

A heater 150 may be provided on the hot water path 95 to heat liquid and a hot water valve 145 configured to open and close the hot water path 95. In this case, a first end of the hot water path 95 may be connected to an upstream of the second filtered valve 143, and a second end of the hot water path 95 may be connected to a downstream of the second filtered valve 143.

A cooler 160 may be provided on the cold water path 96 to cool liquid and a cold water valve 146 configured to open and close the cold water path 96. In this case, a first end of the cold water path 96 may be connected to the upstream of the second filtered valve 143, and a second end of the cold water path 96 may be connected to the downstream of the second filtered valve 143.

The first drain path 97 may be branched from the second filtered path 93 on the downstream of the second filtered valve 143. That is, the first drain path 97 may be branched from the second filtered path 93 on the downstream of the second filtered valve 143 and connected to the drain 99 so to allow the liquid in the first filtered path 92 and the second filtered path 93 to be discharged to the outside.

A first drain valve 147 may be provided on the first drain path 97 to control the flow of liquid by opening and closing the first drain path 97 and a check valve may be provided on the first drain path 97 to prevent a reverse flow of the liquid may be provided on the first drain path 97. In response to the opening of the first drain valve 147, the liquid flowing through the first filtered path 92 and the second filtered path 93 may be introduced into the first drain path 97, and then discharged to the outside through the drain 99 of the filtration apparatus 1 connected to an end portion of the first drain path 97.

An end of the second filtered path 93 may be connected to the dispenser 50. The second filtered valve 143 may be provided on the downstream of the first filtered valve 142 and the upstream of the dispenser 50 to control the flow of liquid. That is, in response to the opening of the first and second filtered valves 142 and 143, the liquid filtered by the filter 21 may be discharged to the outside through the dispenser 50 provided at the end of the filtered paths 92 and 93.

The filtration apparatus 1 may include a second drain path 98 branched from the filter 21 and connected to the drain 99. For example, the second drain path 98 may guide the liquid remaining in the filter 21 to the drain 99.

In this case, the second drain valve 148 may be provided on the second drain path 98 to control the flow of the liquid remaining in the filter 21 by opening and closing the second drain path 98.

Figure 3:
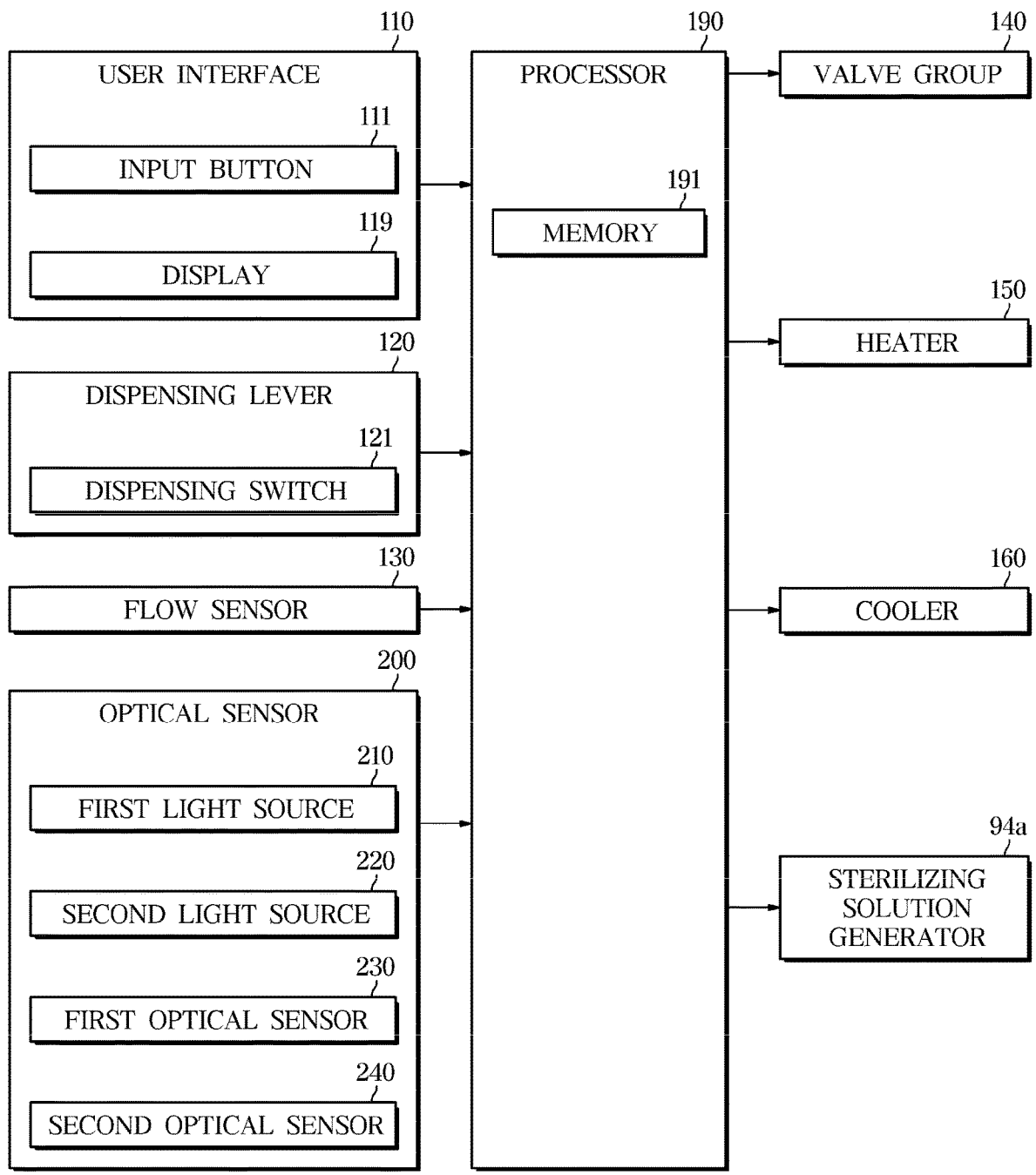
FIG. 3 is a view illustrating a configuration of the filtration apparatus according to various embodiments of the disclosure.
Figure 4:
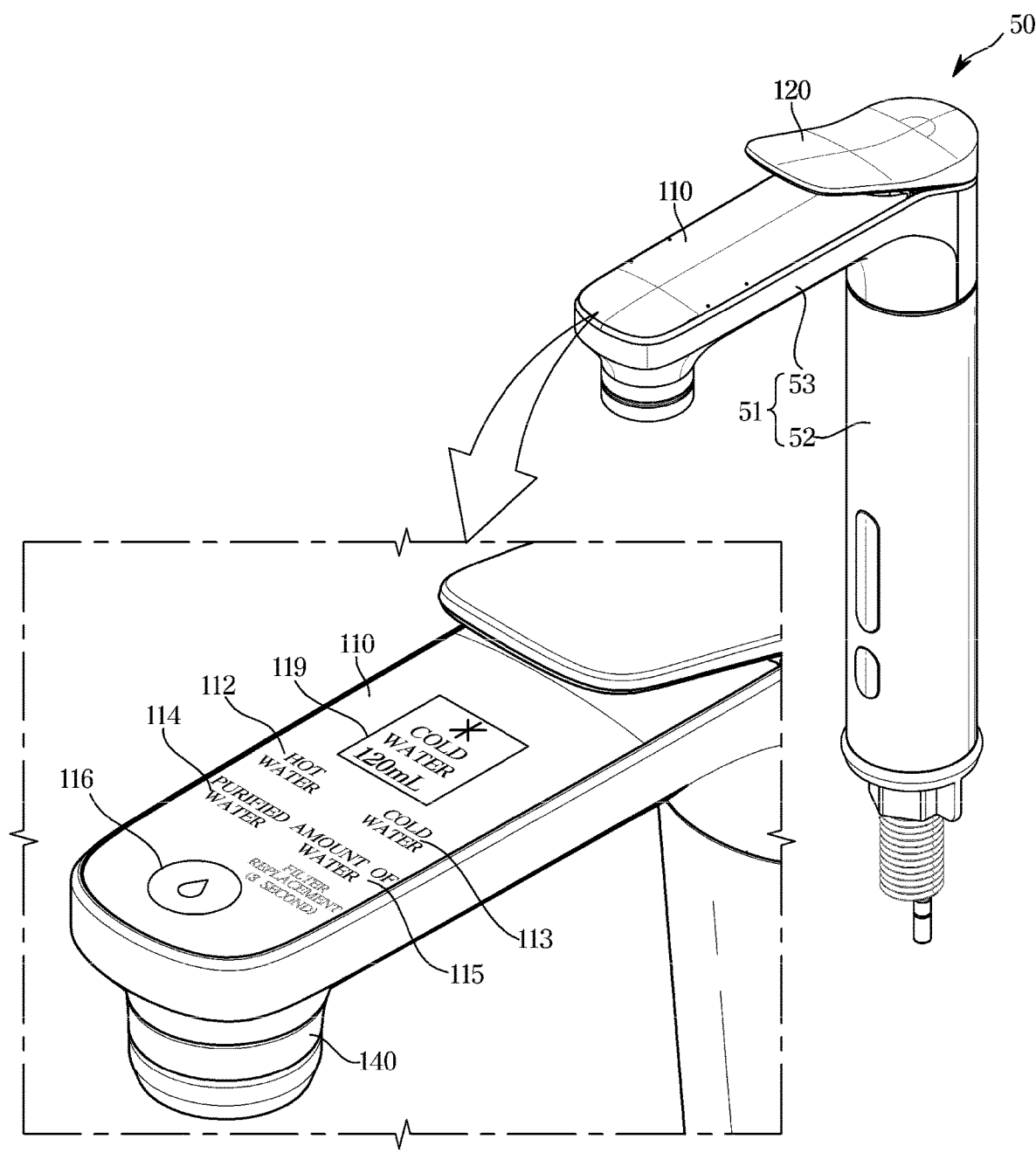
FIG. 4 is a view illustrating a dispenser and a user interface of the filtration apparatus according to various embodiments of the disclosure.

FIG. 3 is a view illustrating a configuration of the filtration apparatus according to various embodiments of the disclosure. FIG. 4 is a view illustrating the dispenser and a user interface of the filtration apparatus according to various embodiments of the disclosure.

Referring to FIGS. 3 and 4, the filtration apparatus 1 may include a user interface 110, a dispensing lever 120, a flow sensor 130, a valve group 140: 141 to 148, the heater 150, the cooler 160, an optical sensor 200 and/or a processor 190.

The user interface 110 may be provided on an upper surface of the dispenser 50.

As illustrated in FIG. 4, the dispenser 50 may include a dispenser body 51 provided to form an exterior and in which various components arranged therein. The dispenser body 51 may be approximately formed in the shape of the English letter "F". One side of the dispenser body 51 may be rotatably coupled to the kitchen worktop 2.

The dispenser body 51 may include a neck 52 extending approximately upward, and a head 53 extending approximately horizontally from an upper end of the neck 52. A lower end of the neck 52 may be rotatably coupled to the kitchen worktop 2 by the rotating member 60.

The neck 52 may be separately formed and coupled with the head 53 or, alternatively, the neck 52 may be integrally formed with the head 53. The neck 52 may be perpendicular and inclined with respect to one surface of the kitchen worktop 2 on which the installation member 3 is formed.

The user interface 110 may be provided on the upper surface of the dispenser 50. Particularly, the head 53 may open in an upward direction, and the user interface 110 may be coupled to an upper surface of the open head 53 to cover an internal space of the head 53 in which various electronic components are arranged. However, the type and position of the user interface 110 are not limited to the above example, and as long as the type and position of the user interface is provided to receive a type of liquid and/or a set temperature of hot water from a user, there is no limitation in the type and position of the user interface.

The user interface 110 may receive a touch input and may output an image. The user interface 110 may include an input button 111 provided to obtain a user input, and a display 119 provided to display a discharge setting and/or operation information of the filtration apparatus 1 in response to the user input.

The input button 111 may include a plurality of buttons provided to obtain various user inputs.

For example, as illustrated in FIG. 4, the input button 111 may further include a hot water button 112 provided to obtain a user input for setting discharging hot water through the dispenser 50, a cold water button 113 provided to obtain a user input for setting discharging cold water through the dispenser 50, a filtered water button 114 provided to obtain a user input for setting discharging filtered water through the dispenser 50, a setting button 115 provided to obtain a user input for setting a target amount of liquid discharged through the dispenser 50, or a dispensing button 116 provided to obtain a user input for requesting to discharge liquid (e.g., hot water, cold water, or room temperature liquid, etc.) through the dispenser 50.

The input button 111 may include at least one of a tact switch, a push switch, a slide switch, a toggle switch, a micro switch, and a touch switch.

The input button 111 may include a plurality of light sources to emit a light beam depending on an activation of the filtration apparatus 1. For example, the input button 111 may include a first light source provided under the hot water button 112, a second light source provided under the cold water button 113, a third light source provided under the filtered water button 114, a fourth light source provided under the setting button 115, and/or a fifth light source provided under the dispensing button 116. The first, second, third, fourth and/or fifth light sources may be turned off in response to a standby mode of the filtration apparatus 1 and turned on in response to the activation of the filtration apparatus 1. The first, second, third, fourth and/or fifth light sources may include light emitting diodes (LEDs).

Each of the plurality of buttons may obtain a user input and may provide an electrical signal (e.g., a voltage signal or a current signal) indicating the obtained user input to the processor 190. The processor 190 may identify a user input based on output signals of the plurality of buttons. For example, the processor 190 may identify a user input based on the output signal of the plurality of buttons. For example, the processor 190 may control the valve group 140 to discharge hot water, cold water, or room temperature water based on the user input by the hot water button 112, the cold water button 113, or the filtered water button 114. Further, the processor 190 may set a target amount of liquid discharged through the dispenser 50 based on the user input by the setting button 115. The target amount may be a predetermined amount, such as 120 ml, 260 ml, 500 ml, 1,000 ml, etc., and the target amount of the liquid may be set based on a number of times in which the setting button 115 is touched or pressed.

The display 119 may receive a display signal from the processor 190. According to the display signal, the display 119 may display setting information and/or operation information of the filtration apparatus 1 corresponding to a user input. For example, the display 119 may display a liquid temperature (e.g., hot water, cold water, or filtered water) set by the input button 111 and/or a discharge amount of liquid set by the setting button 115, which are set during the liquid is not discharged. In addition, the display 119 may display an amount of liquid discharged through the dispenser 50 while the liquid is being discharged.

The display 119 may include a liquid crystal display (LCD) panel and a light emitting diode (LED) panel.

The dispensing lever 120 may be provided near the user interface 110 on the upper surface of the dispenser 50.

The dispensing lever 120 may change a position or posture thereof by a user physical pressure. The dispensing lever 120 may include a dispensing switch 121 to be turned on or off (closed or opened) according to the position or posture of the dispensing lever 120. For example, in response to a first position or a first posture of the dispensing lever 120, the dispensing switch 121 may be turned off or opened. In response to the dispensing lever 120 being moved to a second position or a second posture by the user physical pressure, the dispensing switch 121 may be turned on or closed.

The dispensing switch 121 may obtain a user input requesting to discharge liquid (e.g., hot water, cold water, or room temperature liquid) through the dispenser 50. The dispensing switch 121 may include a push switch, a micro switch, or a reed switch.

The dispensing switch 121 may provide an electrical signal representing the obtained user input to the processor 190. The processor 190 may identify a user input requesting to discharge the liquid, based on the output signal of the dispensing switch 121.

The flow sensor 130 may be provided on the filtered path 92 and may identify the flow of liquid passing through the flow sensor 130. In other words, the flow sensor 130 may identify the flow of the liquid that is filtered by the filter unit 20 and passes through the filtered path 92. In addition, the flow sensor 130 may identify a speed at which the liquid passes through the flow sensor 130 such as an amount of liquid passing through the flow sensor 130 per unit time.

The flow sensor 130 may provide an electrical signal indicating the flow of the liquid or the flow rate of the liquid to the processor 190. The processor 190 may identify the amount of liquid passing through the flow sensor 130 or the amount of hot water, cold water, or room temperature liquid discharged through the dispenser 50 based on the output signal of the flow sensor 130.

The valve group 140 may include a plurality of valves described above in FIG. 2. For example, the valve group 140 may include the source valve 141, the first filtered valve 142, the second filtered valve 143, the sterilizing solution valve 144, the hot water valve 145, and the cold water valve 146, the first drain valve 147 and/or the second drain valve 148. Each of the plurality of valves may be arranged on the source path 91, the sterilizing solution path 94, the hot water path 95, the cold water path 96, the first drain path 97, or the second drain path 98, respectively.

The plurality of valves may include an electric operated valve (e.g., a solenoid valve) to open or close a flow path by a driving current (or driving voltage).

Each of the plurality of valves may include a valve drive to supply a driving current (apply a driving voltage) to each of the plurality of valves contained in the valve group in response to an open/close signal of the processor 190. For example, the valve drive may supply a driving current to a valve to open the valve that is a normally closed valve or supply a driving current to a valve to close the valve that is a normal open valve. The valve drive may include a power switch (e.g., MOSFET, BJT, IGBT, etc.) to supply or block a driving current to each of a plurality of valves in response to the open/close signal of the processor 190 and a circuit attached thereto.

The heater 150 may be provided on the hot water path 95, and may heat liquid (e.g., filtered water) passing through the hot water path 95.

The heater 150 may emit heat by a driving current or driving voltage. An amount of heat emitted by the heater 150 may be proportional to the square of the driving current supplied to the heater 150. The heater 150 may include a heater drive to supply a driving current (or apply a driving voltage) to the heater 150 in response to a heating signal from the processor 190. The heater drive may include a power switch to supply or block the driving current to the heater 150 in response to a heating signal of the processor 190, and a circuit attached thereto.

The cooler 160 may be provided on the cold water path 96, and may cool liquid (e.g., filtered water) passing through the cold water path 96.

The cooler 160 may include a cooling circuit including a compressor, a condenser, an expander, and an evaporator. The compressor may include a motor and may circulate a refrigerant in the cooling circuit using the motor. The cooler 160 may cool the liquid by evaporation of the refrigerant that circulates in the refrigerant circuit.

The cooler 160 may include a motor drive to supply a driving current or apply a driving voltage to the motor included in the cooler 160 in response to a cooling signal from the processor 190. The motor drive may include a power switch to supply or block a driving current to the motor of the cooler 160 in response to the cooling signal of the processor 190, and a circuit attached thereto. The motor drive may include an inverter circuit to supply or block the driving current to the motor.

The sterilizing solution generator 94*a* may be provided on the sterilizing solution path 94 and add a sterilizing material such as hypochlorous acid or hydroxyl radical to the liquid passing through the sterilizing solution path 94.

The sterilizing solution generator 94*a* may include a positive electrode 94*b* and a negative electrode 94*c* for electrolyzing the liquid.

The sterilizing solution generator 94*a* may include an electrode drive to apply a voltage to the positive electrode 94*b* and the negative electrode 94*c* in response to a sterilization signal of the processor 190. The electrode drive may apply or block a voltage to the positive electrode 94*b* and the negative electrode 94*c* in response to the sterilization signal of the processor 190.

The optical sensor 200 may provide data for identifying organic substances and/or inorganic substances contained in the liquid filtered by the filter 21 or data for identifying a concentration of organic substances or the number of organic substances per unit volume and/or a concentration of inorganic substances or the number of inorganic substances per unit volume contained in the liquid filtered by the filter 21.

The optical sensor 200 may be provided on the flow path 90 downstream of the filter 21. The optical sensor 200 may be provided between the first filtered path 92 and the second filtered path 93 or between the first filtered valve 142 and the second filtered valve 143. The optical sensor 200 may also be provided between the second filtered path 93 and the dispenser 50 or between the second filtered valve 143 and the dispenser 50.

The optical sensor 200 may include a first light source 210, a second light source 220, a first optical sensor 230, and/or a second optical sensor 240. The first light source 210 and the second light source 220 may emit light beams of different wavelength ranges, and the first optical sensor 230 and the second optical sensor 240 may be arranged at different positions. For example, the second optical sensor 240 may be located on a path in which a light beam emitted from the first light source 210 and the second light source 220 travels, and the first optical sensor 230 may be located out of the path in which a light beam emitted from the first light source 210 and the second light source 220 travels.

The processor 190 may be electrically connected to the user interface 110, the dispensing lever 120, the flow sensor 130, the valves 141 to 148 of the valve group 140, the heater 150, the cooler 160, the sterilizing solution generator 94*a*, and/or the optical sensor 200. The processor 190 may process an output signal of the user interface 110, the dispensing lever 120, the flow sensor 130, or the optical sensor 200. In response to the output signal, the processor 190 may provide a control signal to the valves 141-148, the heater 150, the cooler 160, or the sterilizing solution generator 94*a*.

The processor 190 may include a memory 191 to store or memorize a program (a plurality of instructions) or data for processing a signal and providing a control signal. The memory 191 may include a volatile memory such as Static Random Access Memory (S-RAM) and Dynamic Random Access Memory (D-RAM), and a non-volatile memory such as Read Only Memory (ROM), and Erasable Programmable Read Only Memory (EPROM). The memory 191 may be provided integrally with the processor 190 or as a semiconductor device separate from the processor 190.

The processor 190 may further include a processing core (e.g., an arithmetic circuit, a memory circuit, and a control circuit) to process a signal and to output a control signal based on a program or data stored in the memory 191.

The filtration apparatus 1 may further include an external memory provided outside the processor 190.

The processor 190 may process an output signal of the user interface 110 or the dispensing lever 120 and identify a user input. The processor 190 may provide a control signal to the valves 141-148, the heater 150, and/or the cooler 160 to discharge hot water, cold water, or room temperature liquid in response to the identified user input.

The processor 190 may clean or sterilize the flow paths 90: 91-98 of the filtration apparatus 1 based on the output of the optical sensor 200.

For example, the processor 190 may identify the concentration of the organic substances based on the output of the optical sensor 200 and may identify the concentration of the organic substances and the inorganic substances based on the output of the optical sensor 200. The processor 190 may clean the flow path 90 of the filtration apparatus 1 based on the concentrations of organic and inorganic substances and may sterilize the flow path 90 of the filtration apparatus 1 based on the concentration of organic substances.

In the above, the configurations of the filtration apparatus 1 have been described. However, the configuration of the filtration apparatus 1 illustrated in FIG. 3 is only an example. For example, some of the components illustrated in FIG. 3 may be omitted or some may be added.

For example, the filtration apparatus 1 may further include a communication device to communicate with an external device. The communication device may include a wireless communication module for wirelessly communicating with an external device or a wired communication module for communicating with an external device by wire.

The wireless communication module may wirelessly transmit and receive communication signals with an access point (AP) or a base station (station). The AP or base station may be connected to a wide area network (e.g., an intranet or the Internet). The wireless communication module may send and receive communication signals to and from a server device of the wide area network through the AP or the base station.

The wired communication module may be connected to a wide area network (e.g., intranet or the Internet) through a hub, router, switch, or gateway. The wired communication module may also transmit and receive communication signals to and from a server device of the wide area network.

Figure 5:
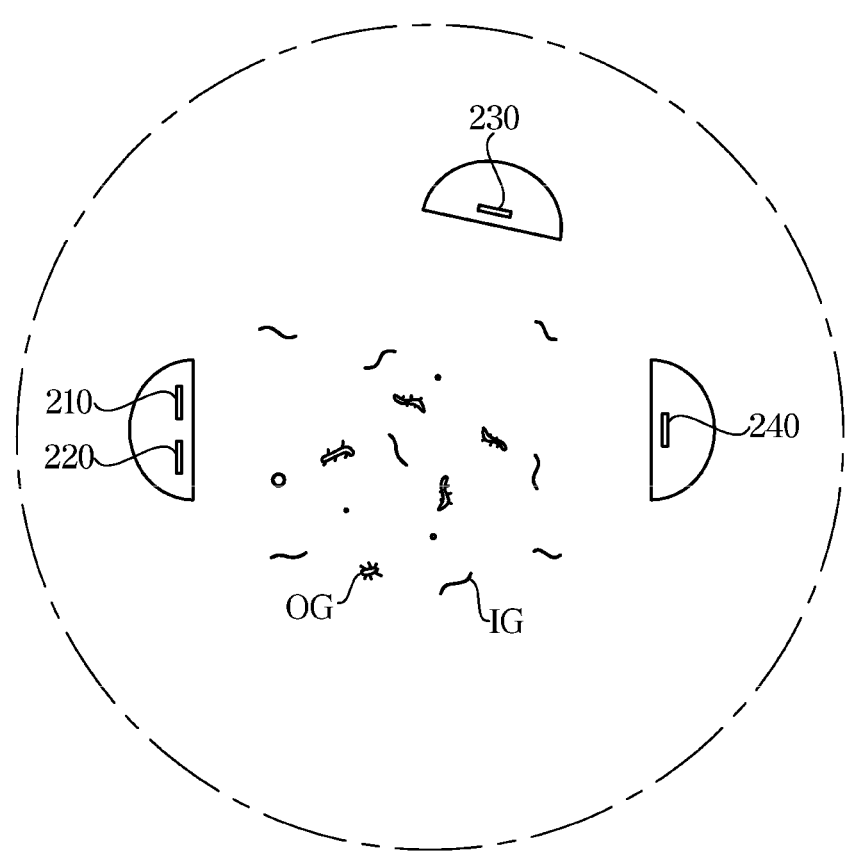
FIG. 5 is a view illustrating an optical sensor of the filtration apparatus according to various embodiments of the disclosure.
Figure 6:
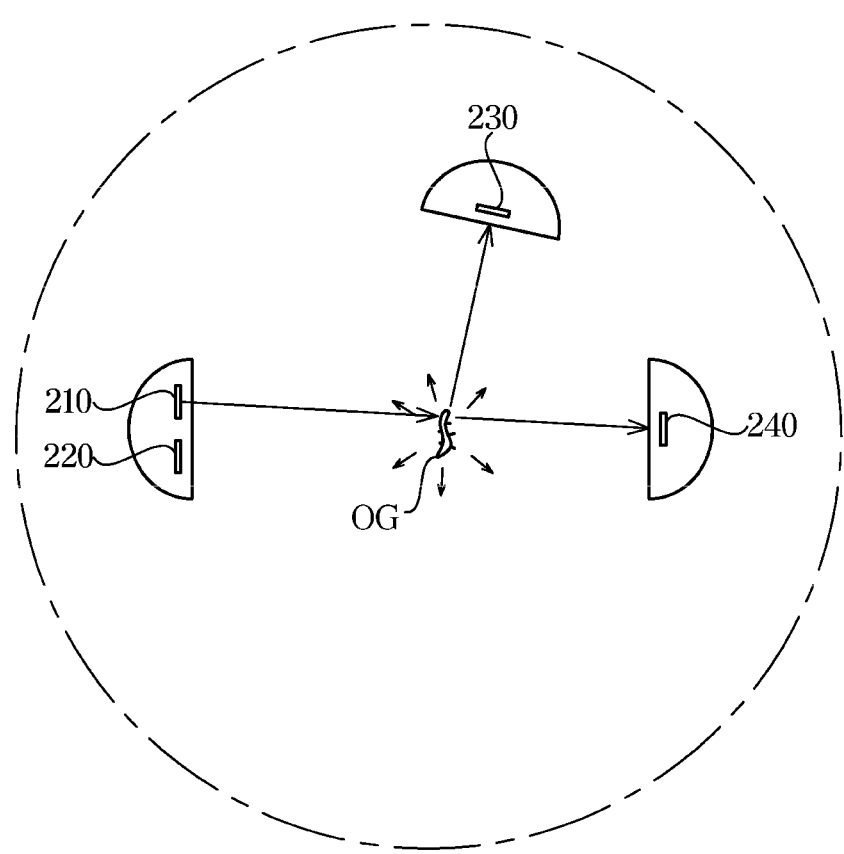
FIG. 6 is a view illustrating an example of operation of a first light source of the filtration apparatus according to various embodiments of the disclosure.
Figure 7:
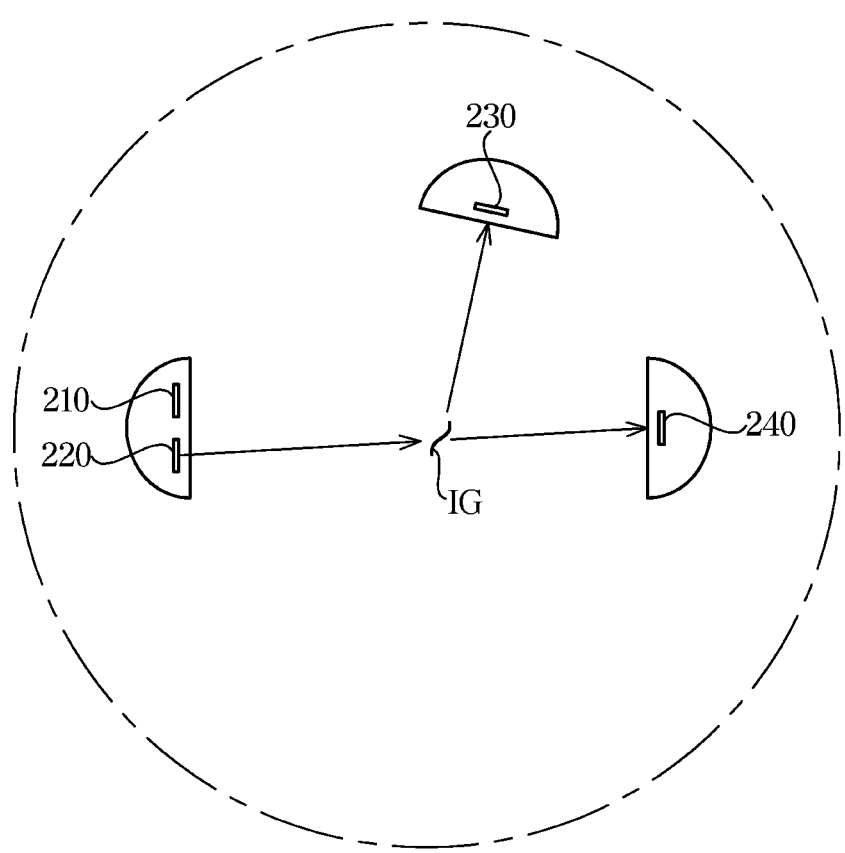
FIG. 7 is a view illustrating an example of operation of a second light source of the filtration apparatus according to various embodiments of the disclosure.
Figure 8:
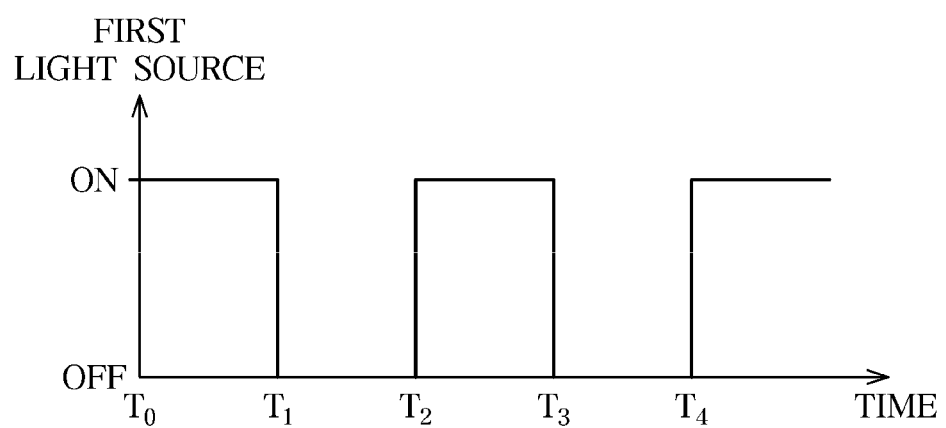
FIG. 8 is a view illustrating an example in which the filtration apparatus according to various embodiments of the disclosure controls the optical sensor.
Figure 8:
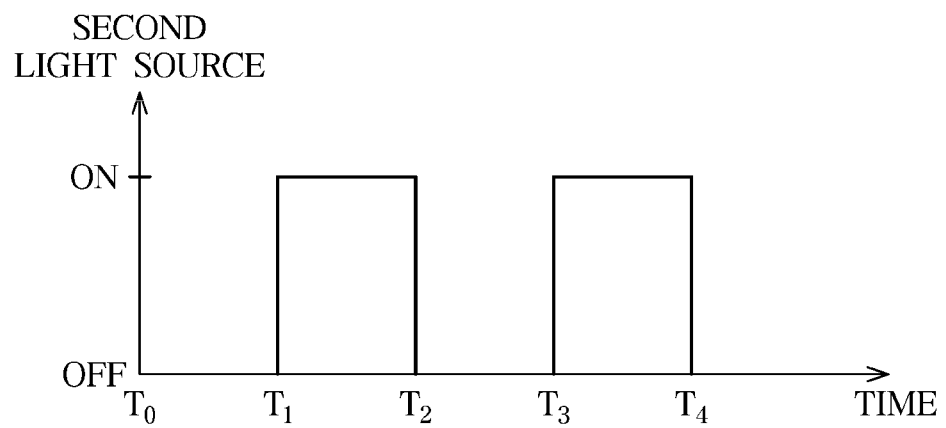

FIG. 5 is a view illustrating the optical sensor of the filtration apparatus according to various embodiments of the disclosure. FIG. 6 is a view illustrating an example of operation of the first light source of the filtration apparatus according to various embodiments of the disclosure. FIG. 7 is a view illustrating an example of operation of the second light source of the filtration apparatus according to various embodiments of the disclosure. FIG. 8 is a view illustrating an example in which the filtration apparatus according to various embodiments of the disclosure controls the optical sensor.

As illustrated in FIG. 5, the optical sensor 200 may include the first light source 210, the second light source 220, the first optical sensor 230, and the second optical sensor 240.

The first light source 210 may emit a light beam of a predetermined wavelength band. For example, the first light source 210 may emit an ultraviolet (UV) light or a light beam of blue wavelength band. In other words, the light beam emitted from the first light source 210 may have a peak in the UV or blue wavelength band.

The second light source 220 may emit a light beam of a predetermined wavelength band. For example, the second light source 220 may emit a light beam having a wavelength band of visible light or infrared light. In other words, the light beam emitted from the second light source 220 may have a peak in the visible light wavelength or infrared band.

The second light source 220 may emit a light beam having a wavelength band different from that of the first light source 210. For example, while the first light source 210 emits a light beam of a wavelength band of UV light, the second light source 220 may emit a light beam of a wavelength band of visible light or infrared light. As another example, while the first light source 210 emits a light beam of a blue wavelength band, the second light source 220 may emit a light beam of a red and/or infrared wavelength band.

The second light source 220 may be arranged adjacent to or spaced apart from the first light source 210. For example, as illustrated in FIG. 5, the second light source 220 may be accommodated in the same housing as the first light source 210. However, the arrangement of the second light source 220 is not limited to that illustrated in FIG. 5, and the second light source 220 may be accommodated in a housing different from that of the first light source 210.

The first optical sensor 230 may receive a light beam and output an electrical signal (e.g., a voltage signal or a current signal) corresponding to an intensity of the received light. For example, the first optical sensor 230 may include a photodiode to output a current of a magnitude depending on the intensity of the received light.

The first optical sensor 230 may receive a light beam having a wavelength band of light emitted from the first light source 210 and the second light source 220. For example, the first optical sensor 230 may receive light beams of ultraviolet, visible, and infrared bands, and may output an electrical signal corresponding to the intensity of the received light.

In the same manner as the first optical sensor 230, the second optical sensor 240 may receive a light beam and output an electrical signal corresponding to the intensity of the received light. For example, the second optical sensor 240 may include a photodiode.

The second optical sensor 240 may also receive a light beam having a wavelength band of light emitted from the first light source 210 and the second light source 220.

The second optical sensor 240 may be arranged to be spaced apart from the first light source 210. For example, as illustrated in FIG. 5, the second optical sensor 240 may be accommodated in a housing different from that of the first optical sensor 230.

For example, the second optical sensor 240 may be arranged on a path in which a light beam emitted from the first light source 210 and the second light source 220 travels. In other words, the first light source 210 and the second light source 220 may emit a light beam toward the second optical sensor 240, and the second optical sensor 240 may directly receive a light beam emitted from the first light source 210 and the second light source 220.

In addition, the first optical sensor 230 may be arranged at a position out of the path in which a light beam emitted from the first light source 210 and the second light source 220 travels. In other words, the first optical sensor 230 may not directly receive the light beams emitted from the first light source 210 and the second light source 220. The first optical sensor 230 may receive light scattered by, or re-emitted from particles located on the travel path of the light beam.

The first optical sensor 230 and the second optical sensor 240 may be spaced apart from the first light source 210 and the second light source 220, respectively. In other words, a sufficient space, through which the liquid filtered by the filter 21 passes, may be provided between the first light source 210/second light source 220 and the first optical sensor 230/second optical sensor 240.

Due to the deterioration of the filter 21 or the contamination of the filter 21, the liquid passing through the filter 21 may contain various foreign substances such as organic substances (e.g., bacteria) and inorganic substances (e.g., dust).

The inorganic substances and organic substances contained in the liquid filtered by the filter 21 may scatter the light.

The inorganic substances and organic substances may scatter the incident visible light or infrared light. For example, the light may be diffusely reflected from surfaces of inorganic and organic substances. Light scattered by the inorganic substances and the organic substances may travel in all directions.

For example, as illustrated in FIG. 6, the second light source 220 may emit a visible light beam or an infrared beam, and most of the visible light or infrared light emitted from the second light source 220 may pass through the inorganic substances IG and then incident on the second optical sensor 240. In this case, a portion of visible light or infrared light emitted from the second light source 220 may be scattered by the inorganic substances IG. As a portion of visible light or infrared light emitted from the second light source 220 is scattered, the intensity of visible light or infrared light received by the second optical sensor 240 may be reduced. Further, the first optical sensor 230 may receive a portion of scattered visible light or infrared light, and may provide an electrical signal corresponding to the intensity of the received visible light or infrared light to the processor 190.

In this case, the intensity of scattered visible or infrared light may depend on the concentration (or the number of particles per unit volume) of organic and/or inorganic substances contained in the filtered liquid. In addition, as the concentration of organic and/or inorganic substances included in the filtered liquid is increased, the intensity of visible light or infrared light received by the first optical sensor 230 may be increased, and the intensity of visible light or infrared light received by the second optical sensor 240 may be reduced. In other words, the output (e.g., output voltage or output current) of the first optical sensor 230 may be increased and the output (e.g., output voltage or output current) of the second optical sensor 240 may be reduced.

Organic and inorganic substances may scatter UV light that is incident. However, because the wavelength of the UV light is short, UV light may be scattered by relatively small particles. Therefore, the intensity of UV light scattered by organic and inorganic substances included in the filtered liquid may be relatively small.

The organic substances may selectively absorb the incident UV light and re-emit the absorbed UV light. In this case, the organic substances may emit the absorbed UV light to all directions.

For example, as illustrated in FIG. 7, the first light source 210 may emit an UV beam, and most of the UV beam emitted from the first light source 210 may pass through the organic substances OG and then incident on the second optical sensor 240. A portion of the UV light emitted from the first light source 210 may be absorbed by the organic substances OG. The organic substances OG absorbing the UV light may emit UV light to all directions. The UV light emitted from the organic substances OG may be incident on the first optical sensor 230. As mentioned above, the first optical sensor 230 may receive a portion of the UV light emitted from the organic substances OG, and may provide an electrical signal corresponding to the intensity of the received UV light to the processor 190.

In this case, the intensity of the absorbed/re-emitted UV light may depend on the concentration (or the number of particles per unit volume) of organic substances included in the filtered liquid. In addition, as the concentration of the organic substances included in the filtered liquid is increased, the intensity of the UV light received by the first optical sensor 230 may be increased and the intensity of the UV light received by the second optical sensor 240 may be reduced. In other words, the output (e.g., output voltage or output current) of the first optical sensor 230 may be increased and the output (e.g., output voltage or output current) of the second optical sensor 240 may be reduced.

As mentioned above, a main reason that the emitted visible or infrared beam deviates from the path may be scattering of light by the organic and/or inorganic substances. Accordingly, the filtration apparatus 1 may identify the concentration of organic and/or inorganic substances using visible light or infrared light.

On the other hand, a main reason that the emitted UV beam deviates from the path may be absorption and re-emission of light by the organic substances. Accordingly, the filtration apparatus 1 may identify the concentration of organic substances by using UV light.

The processor 190 may alternately activate the first light source 210 and the second light source 220 to separately identify the concentration of the organic substances and the concentration of the organic substances/inorganic substances.

For example, as illustrated in FIG. 8, the processor 190 may activate the first light source 210 and deactivate the second light source 220 between time T0 and time T1 in order to identify the concentration of organic substances using UV light. The processor 190 may activate the second light source 220 and deactivate the first light source 210 between time T1 and time T2 in order to identify the concentration of organic and/or inorganic substances using visible light or infrared light. The processor 190 may activate the first light source 210 and deactivate the second light source 220 between time T2 and time T3. Further, the processor 190 may activate the second light source 220 and deactivate the first light source 210 between time T3 and time T4.

Accordingly, by alternately activating the first light source 210 and the second light source 220, the processor 190 may identify the concentration of organic substances, and the concentration of organic substances and inorganic substances, independently of each other, without interference between UV light and visible light or interference between UV light and infrared light.

Figure 9:
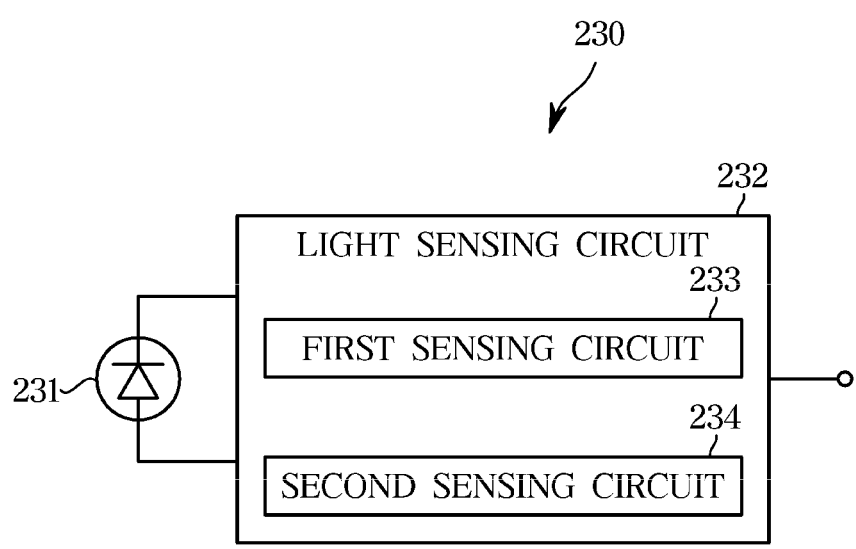
FIG. 9 is a view illustrating a configuration of a first optical sensor of the filtration apparatus according to various embodiments of the disclosure.
Figure 10:
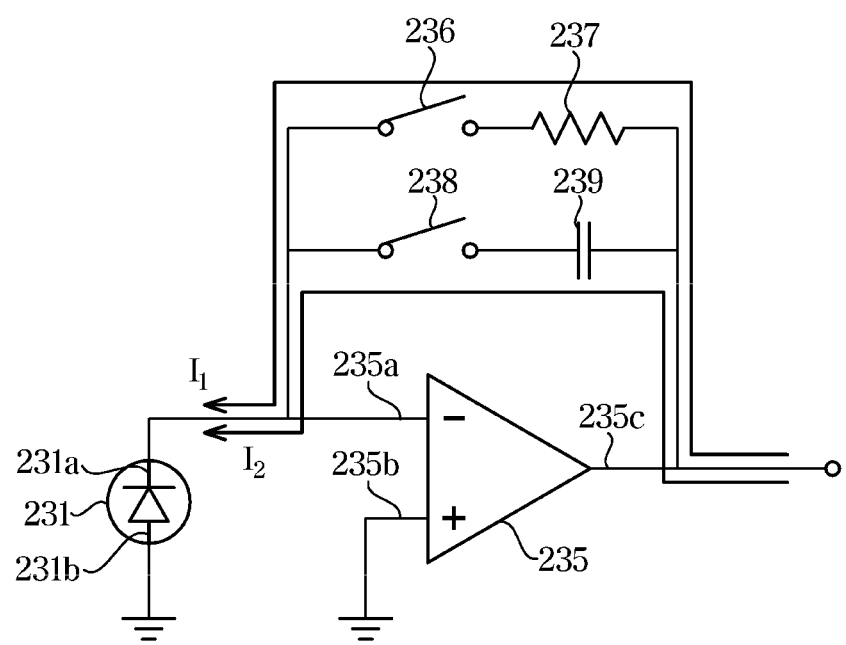
FIG. 10 is a view illustrating an example of the first optical sensor illustrated in FIG. 9.

FIG. 9 is a view illustrating a configuration of the first optical sensor of the filtration apparatus according to various embodiments of the disclosure. FIG. 10 is a view illustrating an example of the first optical sensor illustrated in FIG. 9.

Hereinafter the configuration of the first optical sensor 230 will be described. The configuration of the second optical sensor 240 is substantially the same as that of the first optical sensor 230, and thus a description of the configuration of the second optical sensor 240 is omitted.

As illustrated in FIGS. 9 and 10, the first optical sensor 230 may include a photodiode 231 and/or a light sensing circuit 232.

The photodiode 231 may receive light in a wavelength band of light emitted from the first light source 210 and the second light source 220. For example, the photodiode 231 may receive light in the UV, visible, and infrared bands.

The photodiode 231 may output a current signal corresponding to the intensity of the received light.

The light sensing circuit 232 may receive a current signal of the photodiode 231 and output a voltage signal corresponding to the current signal of the photodiode 231.

The light sensing circuit 232 may include a first sensing circuit 233 and a second sensing circuit 234. The first sensing circuit 233 may convert the current signal of the photodiode 231 into a first voltage signal without change, and output the first voltage signal. The second sensing circuit 234 may accumulate the current signal of the photodiode 231 and may output a second voltage signal corresponding to the accumulated current signal.

For example, as illustrated in FIG. 10, the light sensing circuit 232 may include an amplifier 235, a first switch 236, an electrical resistor 237, a second switch 238, and a capacitor 239.

A negative input terminal 235a of the amplifier 235 may be connected to a cathode terminal 231a of the photodiode 231. A positive input terminal 235b of the amplifier 235 may be connected to the ground, and an anode terminal 231b of the photodiode 231 may be connected to the ground.

The first switch 236 and the electrical resistor 237 may be connected in series between the output terminal 235c of the amplifier 235 and the negative input terminal 235a of the amplifier 235. The first switch 236 and the electrical resistance 237 may correspond to the first sensing circuit 233.

The second switch 238 and the capacitor 239 may be connected in series between the output terminal 235c of the amplifier 235 and the negative input terminal 235a of the amplifier 235. In other words, the second switch 238 and the capacitor 239 may be connected in parallel to the first switch 236 and the electrical resistance 237. The second switch 238 and the capacitor 239 may correspond to the second sensing circuit 234.

The first switch 236 and the second switch 238 may be turned on alternately.

In response to the photodiode 231 receiving light while the first switch 236 is turned on and the second switch 238 is turned off, the photodiode 231 may output a first current I1 in a reverse direction. The first current I1 may pass through the resistor 237 and flow to the photodiode 231. Accordingly, voltage drop corresponding to the first current I1 may occur in the resistor 237, and a voltage signal corresponding to the first current I1 may be output from the output terminal 235c of the amplifier 235.

Further, in response to the photodiode 231 receiving light while the first switch 236 is turned off and the second switch 238 is turned on, the photodiode 231 may output a second current I2 in a reverse direction. The second current I1 may pass through the capacitor 239 and flow to the photodiode 231. Accordingly, a charge corresponding to the second current I2 may be accumulated in the capacitor 239, and a voltage signal, which corresponds to the charge of the capacitor 239 in which the second current I2 is accumulated, may be output from the output terminal 235c of the amplifier 235.

Accordingly, in response to the output of the voltage signal corresponding to the charge of the second current I1 accumulated in the capacitor 239, the second sensing circuit 234 may accumulate the light received by the photodiode 231 and output an electrical signal corresponding to an intensity of the accumulated light. Therefore, a sensitivity of the light sensing circuit 232 to the light may be improved.

FIG. 11 is a view illustrating an example of operation of the first light source and the first optical sensor of the filtration apparatus according to various embodiments of the disclosure. FIG. 12 is a view illustrating an example of operation of the first light source and the first optical sensor of the filtration apparatus according to various embodiments of the disclosure. FIG. 13 is a view illustrating an example of operation of the first light source and the first optical sensor of the filtration apparatus according to various embodiments of the disclosure.

The filtration apparatus 1 may accurately measure the intensity of the light received by the photodiode 231 by sequentially using the first sensing circuit 233 and the second sensing circuit 234 of the first optical sensor 230.

Particularly, the processor 190 may identify a first intensity of the light received by the photodiode 231 using the first sensing circuit 233 of the first optical sensor 230.

Thereafter, the processor 190 may identify a detecting duration for improving the sensitivity for measuring the intensity of light based on the first intensity of the light. For example, as the first intensity of light is increased, the detecting duration may be reduced, and as the first intensity of light is reduced, the detecting duration may be increased.

Thereafter, the processor 190 may roughly identify the intensity of light with improved sensitivity using the second sensing circuit 234 of the first optical sensor 230. For example, by using the first sensing circuit 233, the processor 190 may identify the intensity of light that is accumulated during an accumulated time.

The processor 190 may activate the first sensing circuit 233 while the first light source 210 is activated. The processor 190 may close (turn on) the first switch 236 to activate the first sensing circuit 233. The processor 190 may control the first light source 210 to emit light.

Figure 11A:
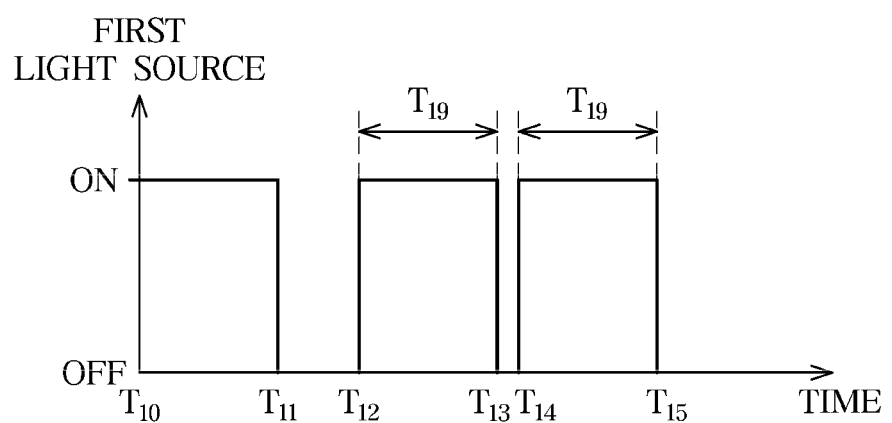
FIGS. 11A and 11B are views illustrating an example of operation of the first light source and the first optical sensor of the filtration apparatus according to various embodiments of the disclosure.

For example, as illustrated in FIG. 11A, the processor 190 may control the first light source 210 to emit light from time T10 to time T11.

Figure 11B:
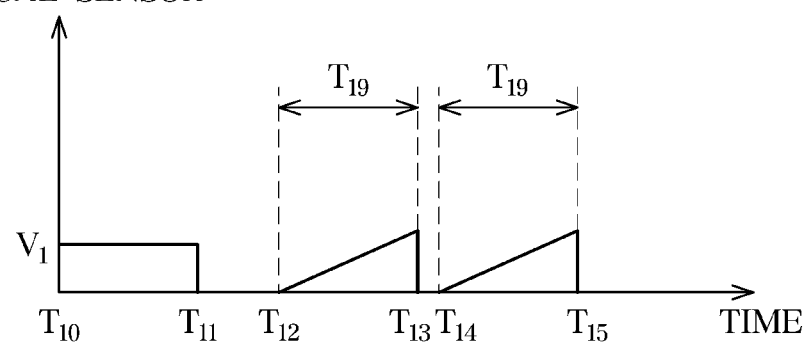

The photodiode 231 of the first optical sensor 230 may receive light absorbed/re-emitted by organic substances (e.g., bacteria) included in the filtered liquid. The photodiode 231 receiving the light may output a reverse current, and thus the first optical sensor 230 may output a first voltage signal V1 from time T10 to time T11, as illustrated in FIG. 11B.

The processor 190 may identify a first detecting duration T19 based on the first voltage signal V1.

The processor 190 may open (turn off) the first switch 236 and close (turn on) the second switch 238 to activate the second sensing circuit 234.

Thereafter, the processor 190 may control the first light source 210 to emit UV light. For example, as illustrated in FIG. 11A, the processor 190 may control the first light source 210 to emit light from time T12 to time T13. In other words, the processor 190 may control the first light source 210 to emit light during the first detecting duration T19.

The photodiode 231 receiving the light absorbed/re-emitted by the organic substances (e.g., bacteria) may output a reverse current. Accordingly, the charges may be accumulated in the capacitor 239, and the first optical sensor 230 may output an output signal that increases from time T12 to time T13, as illustrated in FIG. 11B.

The processor 190 may sample the output of the first optical sensor 230 at time T13 after the first detecting duration T19 is expired, and identify an amount of light received by the photodiode 231, based on the first detecting duration T19 and the sampled output.

Thereafter, the processor 190 may re-set the charge of the capacitor 239 and re-identify the amount of light that is received by the photodiode 231 during the first detecting duration T19.

Figure 12A:
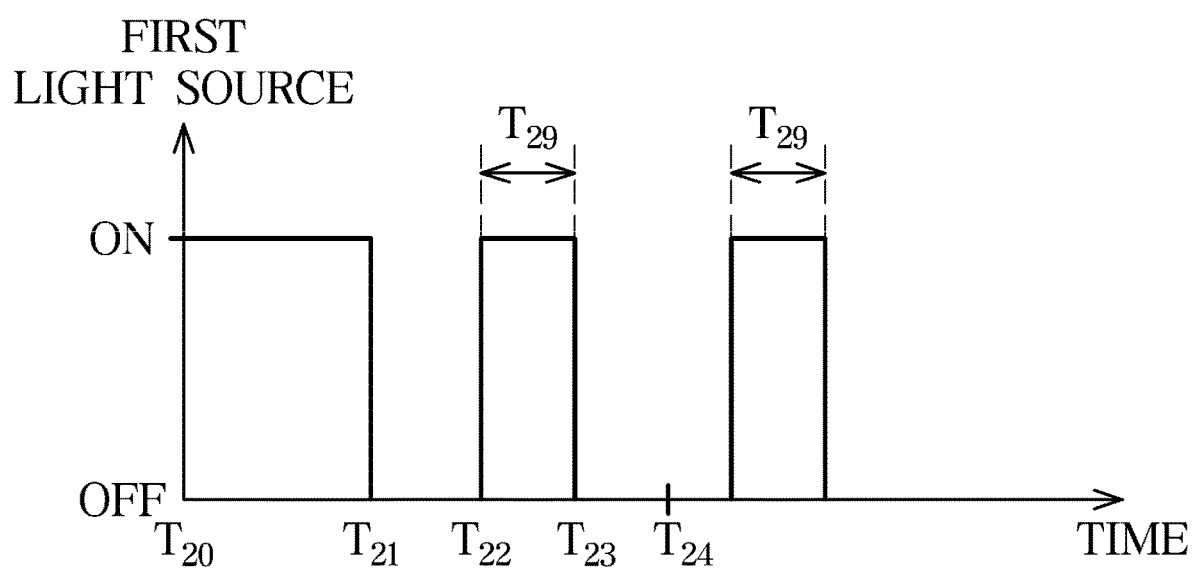
FIGS. 12A and 12B are views illustrating an example of operation of the first light source and the first optical sensor of the filtration apparatus according to various embodiments of the disclosure.

As another example, as illustrated in FIG. 12A, the processor 190 may control the first light source 210 to emit light from time T20 to time T21.

Figure 12B:
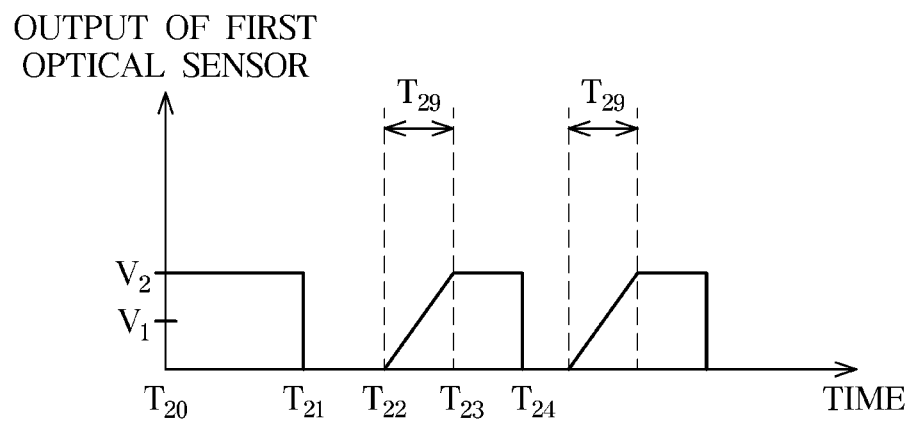

The photodiode 231 receiving the light absorbed/re-emitted by the organic substances (e.g., bacteria) may output a reverse current, and thus the first optical sensor 230 may output a second voltage signal V2 from time T20 to time T21, as illustrated in FIG. 12B. In this case, the second voltage signal V2 may be greater than the first voltage signal V1 illustrated in FIG. 11.

The processor 190 may identify a second detecting duration T29 based on the second voltage signal V2. In this case, the second detecting duration T29 may be less than the first detecting duration T19 illustrated in FIG. 11.

The processor 190 may open (turn off) the first switch 236 and close (turn on) the second switch 238 to activate the second sensing circuit 234.

Thereafter, as illustrated in FIG. 12A, the processor 190 may control the first light source 210 to emit light from time T22 to time T23. In other words, the processor 190 may control the first light source 210 to emit light during the second detecting duration T29.

The photodiode 231 receiving the light absorbed/re-emitted by the organic substances (e.g., bacteria) may output a reverse current. Accordingly, charges may be accumulated in the capacitor 239, and the first optical sensor 230 may output an output signal that increases from time T22 to time T23, as illustrated in FIG. 12B.

The processor 190 may sample the output of the first optical sensor 230 at time T23 after the second detecting duration T29 is expired and identify an amount of light received by the photodiode 231, based on the second detecting duration T29 and the sampled output.

Thereafter, the processor 190 may re-set the charge of the capacitor 239 and re-identify the amount of light that is received by the photodiode 231 during second detecting duration T29.

Figure 13A:
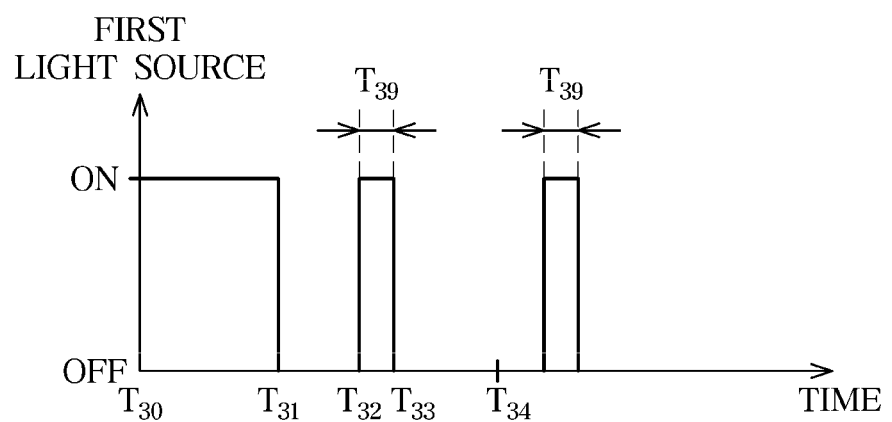
FIGS. 13A and 13B are views illustrating an example of operation of the first light source and the first optical sensor of the filtration apparatus according to various embodiments of the disclosure.

As another example, as illustrated in FIG. 13A, the processor 190 may control the first light source 210 to emit light from time T30 to time T31.

Figure 13B:
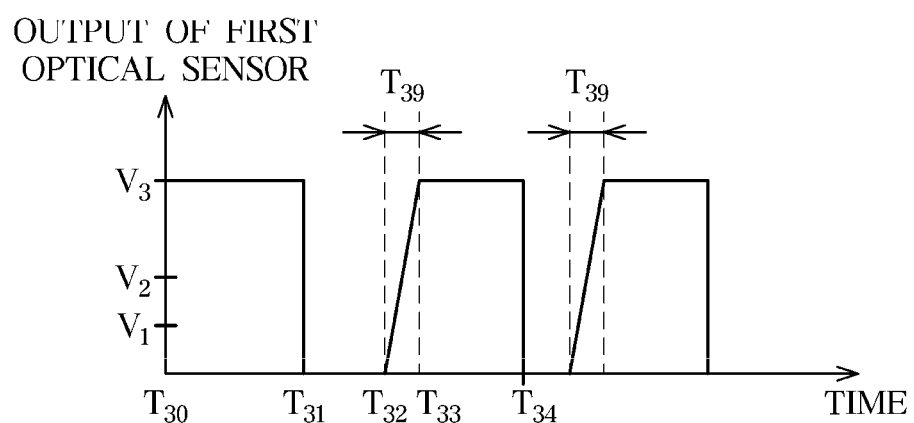

The photodiode 231 receiving the light absorbed/re-emitted by the organic substances (e.g., bacteria) may output a reverse current, and thus the first optical sensor 230 may output a third voltage signal V3 from time T30 to time T31, as illustrated in FIG. 13B. In this case, the third voltage signal V3 may be greater than the second voltage signal V2 illustrated in FIG. 12.

The processor 190 may identify a third detecting duration T39 based on the third voltage signal V3. In this case, the third detecting duration T39 may be less than the second detecting duration T29 illustrated in FIG. 12.

The processor 190 may open (turn off) the first switch 236 and close (turn on) the second switch 238 to activate the second sensing circuit 234.

Thereafter, as illustrated in FIG. 13A, the processor 190 may control the first light source 210 to emit light from time T32 to time T33. In other words, the processor 190 may control the first light source 210 to emit light during the third detecting duration T39.

The photodiode 231 receiving the light absorbed/re-emitted by the organic substances (e.g., bacteria) may output a reverse current. Accordingly, charges may be accumulated in the capacitor 239, and the first optical sensor 230 may output an output signal that increases from time T32 to time T33, as illustrated in FIG. 13B.

The processor 190 may sample the output of the first optical sensor 230 at time T33 after the third detecting duration T39 is expired and identify an amount of light received by the photodiode 231, based on the third detecting duration T39 and the sampled output.

Thereafter, the processor 190 may re-set the charge of the capacitor 239 and re-identify the amount of light that is received by the photodiode 231 during the third detecting duration T39.

As mentioned above, the filtration apparatus 1 may identify the detecting duration based on the instantaneous output of the first optical sensor 230 and identify the intensity of light detected by the first optical sensor 230 based on the accumulated output of the first optical sensor 230 that is accumulated during the detecting duration. Accordingly, the filtration apparatus 1 may improve the sensitivity at which the first optical sensor 230 measures the intensity of light within an appropriate detection range.

A configuration and operation of the second optical sensor 240 are the same as those of the first optical sensor 230, a description thereof will be omitted.

A magnitude of the voltage signal output from the first optical sensor 230 in the activation of the first light source 210 may correspond to an intensity of the light detected by the first optical sensor 230, and also correspond to the concentration of organic substances contained in the liquid passing through the flow path in which the optical sensor 200 is installed. For example, in response to the increase of the concentration of the organic substances included in the liquid, the magnitude of the voltage signal output from the first optical sensor 230 may be increased.

A magnitude of the voltage signal output from the first optical sensor 230 in the activation of the second light source 220 may correspond to an intensity of light detected by the first optical sensor 230, and also correspond to the concentration of organic and inorganic substances contained in the liquid passing through the flow path in which the optical sensor 200 is installed. For example, in response to the increase of the concentration of the organic and inorganic substances included in the liquid, the magnitude of the voltage signal output from the first optical sensor 230 may be increased.

A magnitude of the voltage signal output from the second optical sensor 240 in the activation of the first light source 210 may correspond to the concentration of organic substances contained in the liquid passing through the flow path in which the optical sensor 200 is installed. For example, in response to the increase of the concentration of the organic substances included in the liquid, the magnitude of the voltage signal output from the second optical sensor 240 may be reduced.

A magnitude of the voltage signal output from the second optical sensor 240 in the activation of the second light source 220 may correspond to the concentration of organic and inorganic substances contained in the liquid passing through the flow path in which the optical sensor 200 is installed. For example, in response to the increase of the concentration of the organic and inorganic substances included in the liquid, the magnitude of the voltage signal output from the second optical sensor 240 may be reduced.

The filtration apparatus 1 may clean the flow path based on the concentration of organic and inorganic substances included in the liquid filtered by the filter 21 being equal to or greater than a reference concentration. For example, the filtration apparatus 1 may clean the flow path based the voltage signal, which is output from the first optical sensor 230 in the activation of the second light source 220, being greater than or equal to a first reference value. Further, the filtration apparatus 1 may clean the flow path based the voltage signal, which is output from the second optical sensor 240 in the activation of the second light source 220, being less than or equal to a second reference value.

Depending on the magnitude of the voltage signal, the filtration apparatus 1 may adjust a cleaning time for cleaning the filter 21 and the flow path. For example, the cleaning time may be increased in response to the increase of the magnitude of the voltage signal, and may be reduce in response to the decrease of the magnitude of the voltage signal.

Figure 14:
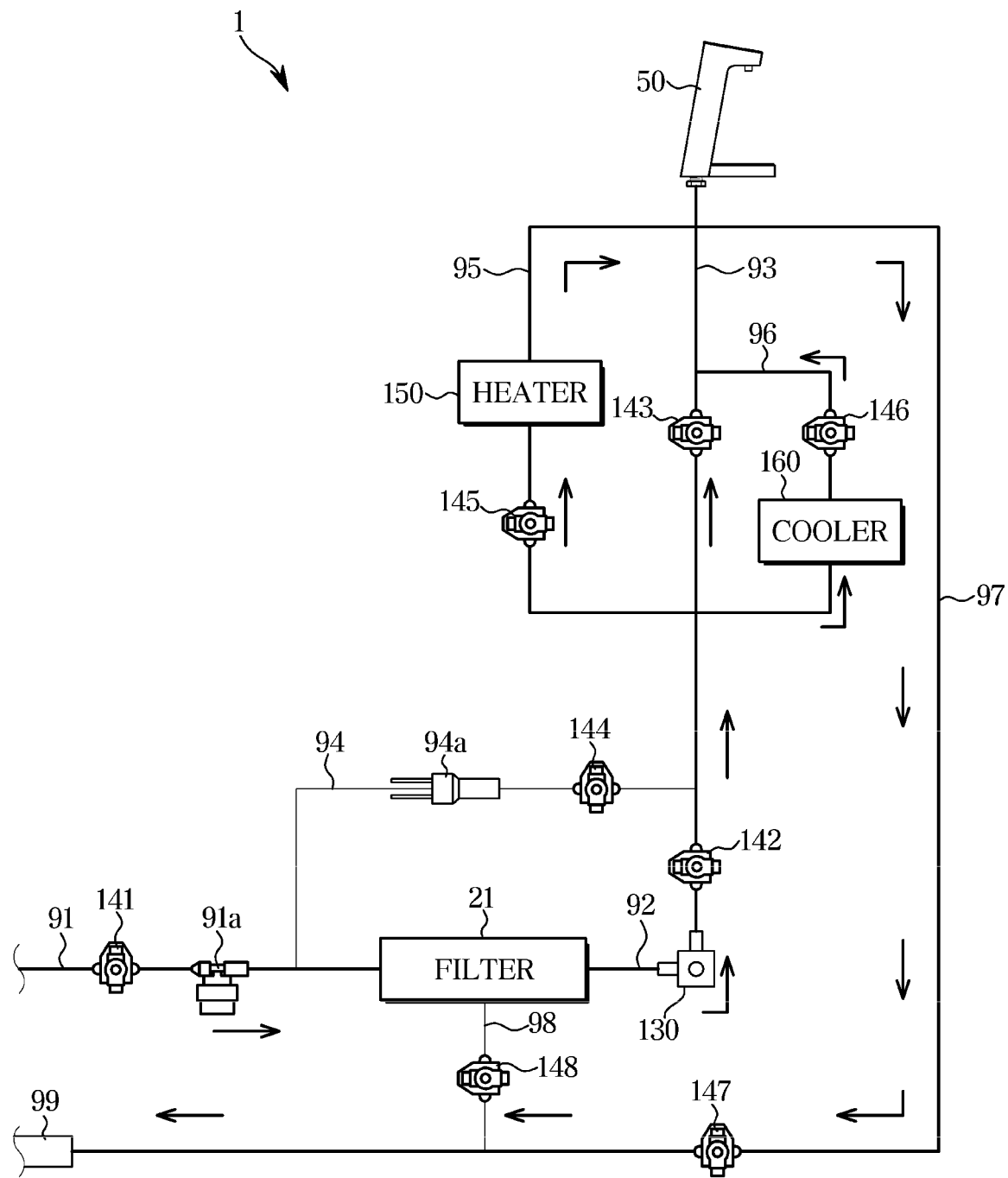
FIG. 14 is a view illustrating an example in which the filtration apparatus according to various embodiments of the disclosure cleans a flow path.

FIG. 14 is a view illustrating an example in which the filtration apparatus according to various embodiments of the disclosure cleans a flow path.

As illustrated in FIG. 14, the filtration apparatus 1 may clean the first filtered path 92, the second filtered path 93, the hot water path 95, and the cold water path 96 through which the filtered liquid flows.

The processor 190 may open the source valve 141, the first filtered valve 142, and the first drain valve 147. Further, the processor 190 may open at least one of the second filtered valve 143, the hot water valve 145, and the cold water valve 146. The second filtered valve 143, the hot water valve 145, and the cold water valve 146 may all be opened, or the second filtered valve 143, the hot water valve 145, and the cold water valve 146 may be sequentially opened one by one.

In response to the opening of the valves, the source liquid may pass through the first filtered path 92 and the filter 21, thereby cleaning the first filtered path 92 and the filter 21. In addition, in response to the opening of the at least one of the second filtered valve 143, the hot water valve 145, and the cold water valve 146, at least one of the second filtered path 93, the hot water path 95, and the cold water path 96 may be cleaned. A cleaning liquid that cleans the filter 21 and the flow path may be discharged to the drain 99 through the first drain path 97.

In addition, the filtration apparatus 1 may sterilize the flow path based on the concentration of the organic substances contained in the liquid filtered by the filter 21 being greater than or equal to a reference concentration. For example, the filtration apparatus 1 may sterilize the flow path based on the magnitude of the voltage signal, which is output from the first optical sensor 230 in the activation of the first light source 210, being greater than or equal to the first reference value. Further, the filtration apparatus 1 may sterilize the flow path based on the magnitude of the voltage signal, which is output from the first optical sensor 230 in the activation of the first light source 210, being less than or equal to a second reference value.

The filtration apparatus 1 may adjust a sterilization time for cleaning the filter 21 and the flow path depending on the magnitude of the voltage signal. For example, the sterilization time may be increased in response to the increase of the magnitude of the voltage signal, and may be reduced in response to the decrease of the magnitude of the voltage signal.

Figure 15:
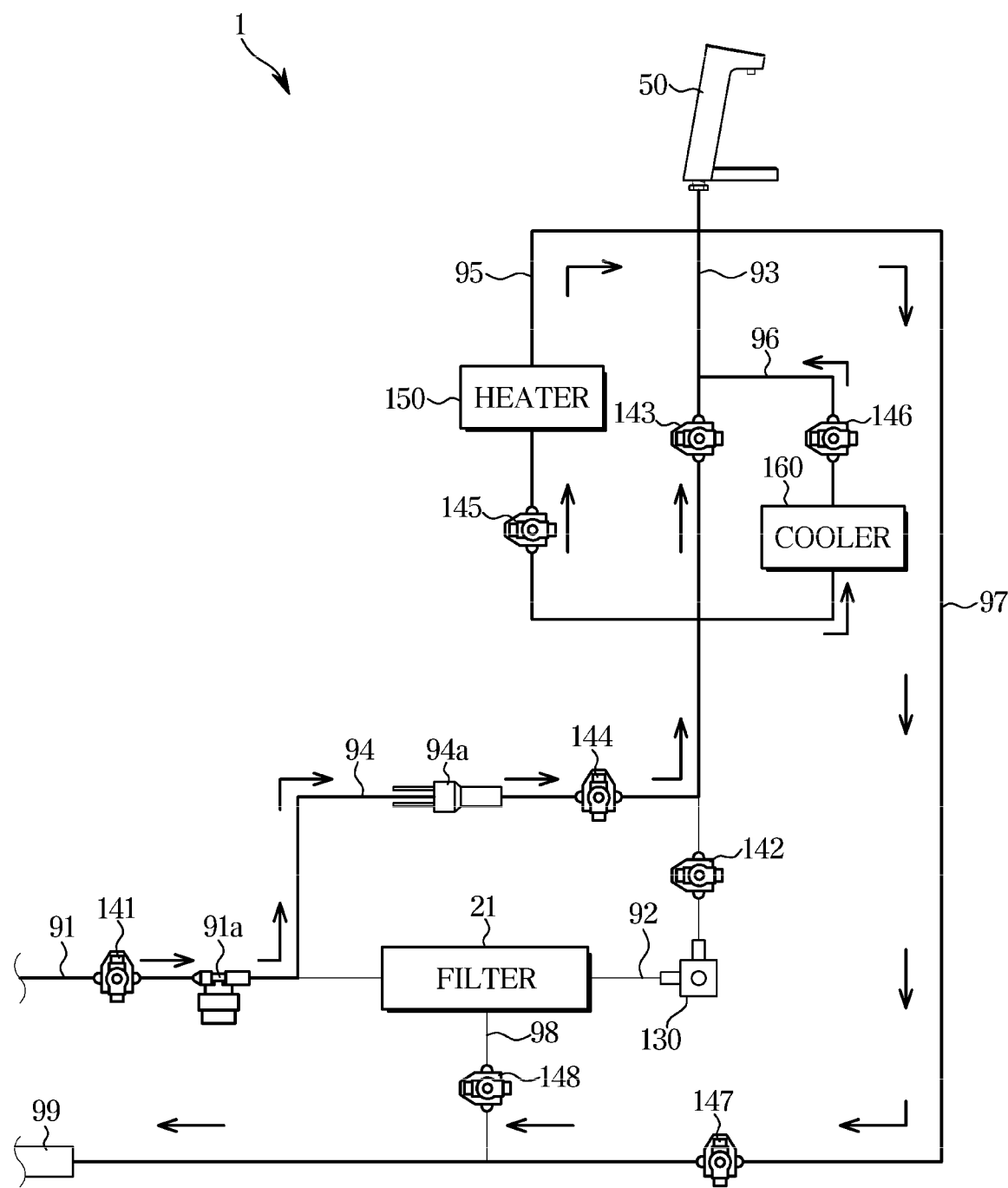
FIG. 15 is a view illustrating an example in which the filtration apparatus according to various embodiments of the disclosure sterilizes the flow path.

FIG. 15 is a view illustrating an example in which the filtration apparatus according to various embodiments of the disclosure sterilizes the flow path.

As illustrated in FIG. 15, the filtration apparatus 1 may sterilize the first filtered path 92, the second filtered path 93, the hot water path 95, and the cold water path 96 through which the filtered liquid flows.

The processor 190 may open the source valve 141, the sterilizing solution valve 144, and the first drain valve 147. The processor 190 may operate the sterilizing solution generator 94a to produce a sterilizing solution. Further, the processor 190 may open at least one of the second filtered valve 143, the hot water valve 145, and the cold water valve 146. The second filtered valve 143, the hot water valve 145, and the cold water valve 146 may all be opened, or the second filtered valve 143, the hot water valve 145, and the cold water valve 146 may be sequentially opened one by one.

In response to the opening of the valves and the operation of the sterilizing solution generator 94a, a sterilizing substance may be mixed with the source liquid, and the sterilizing solution with which the sterilizing substances are mixed may sterilize at least one of the second filtered path 93, the hot water path 95, or the cold water path 96. The sterilizing solution that sterilizes the flow path may be discharged to the drain 99 through the first drain path 97.

As described above, the filtration apparatus 1 may clean or sterilize the filter 21 and/or the flow path based on the output of the optical sensor 200.

Figure 16:
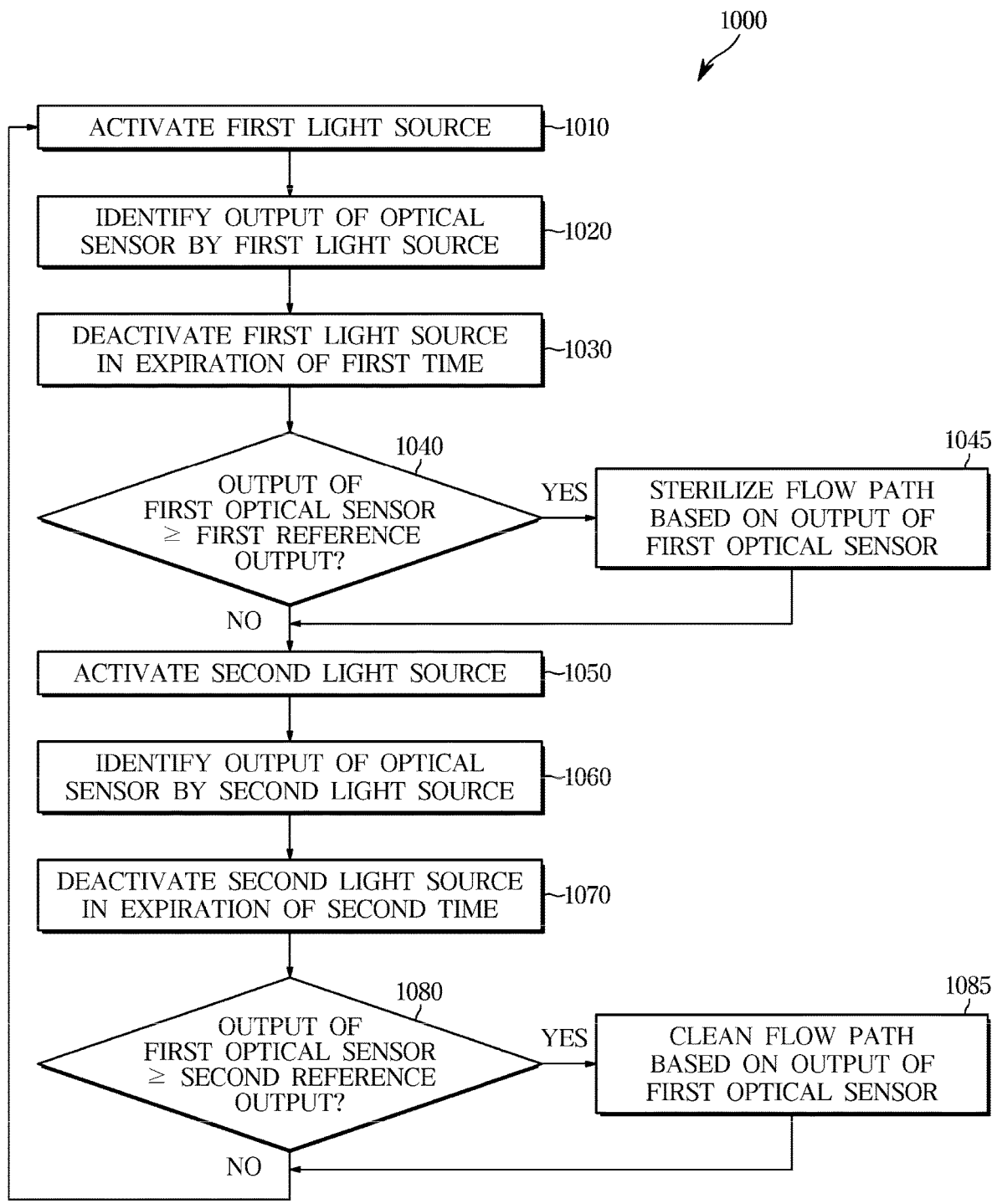
FIG. 16 is a flowchart illustrating a method in which the filtration apparatus according to various embodiments of the disclosure cleans/sterilizes the flow path.

FIG. 16 is a flowchart illustrating a method in which the filtration apparatus according to various embodiments of the disclosure cleans/sterilizes the flow path.

A method 1000 in which the filtration apparatus 1 cleans/sterilizes the flow path will be described with reference to FIG. 16.

The filtration apparatus 1 may activate the first light source 210 (1010).

The filtration apparatus 1 may include the optical sensor 200 to identify the concentration of organic and/or inorganic substances contained in the liquid passing through the filter 21 while the filtered liquid is discharged or while the filtered liquid is not discharged. The optical sensor 200 may include the first light source 210, the second light source 220, the first optical sensor 230, and the second optical sensor 240. The filtered water may pass through between the first and second light sources 210 and 220, and the first and second optical sensors 230 and 240.

The first light source 210 may emit UV light, and the second light source 220 may emit visible light or infrared light. The first optical sensor 230 may be located outside of the path of the light emitted from the first light source 210 and the second light source 220, and the second optical sensor 240 may be located on the path of the light emitted from the first light source 210 and the second light source 220. Accordingly, the first optical sensor 230 may receive the scattered or absorbed/re-emitted light, and the second optical sensor 240 may receive the light emitted from the first light source 210 and the second light source 220.

In order to identify the concentration of the organic substances independently from the concentration of the inorganic substances, the filtration apparatus 1 may activate the first light source 210 in the deactivation of the second light source 220. For example, the processor 190 may control the first light source 210 to emit UV light and control the second light source 220 not to emit visible light or infrared light.

The filtration apparatus 1 may identify the output of the optical sensors 230 and 240 in the activation of the first light source 210 (1020).

The first light source 210 in the activation state may emit UV light. In the activation of the first light source 210, the first optical sensor 230 and/or the second optical sensor 240 may directly or indirectly receive the light emitted from the first light source 210. The first optical sensor 230 and/or the second optical sensor 240 may output an electrical signal corresponding to the intensity of the received light.

The processor 190 may identify an output signal of the first optical sensor 230 and/or an output signal of the second optical sensor 240. The output signal of the first optical sensor 230 may correspond to the intensity of light absorbed/re-emitted by the organic substances contained in the liquid, and the output signal of the second optical sensor 240 may correspond to the intensity of the light passing through the organic substances.

The filtration apparatus 1 may deactivate the first light source in response to the expiration of a predetermined first time (1030).

The processor 190 may deactivate the first light source 210 to alternately activate the second light source 220 and the first light source 210.

The filtration apparatus 1 identifies whether the output of the first optical sensor 230 is greater than or equal to a first reference output (1040).

For example, the processor 190 may compare a magnitude of the output signal of the first optical sensor 230, which is identified in the activation of the first light source 210, with the first reference output. The first reference output may correspond to the concentration of organic substances (bacteria) that can use the liquid for drinking. The first reference output may be set experimentally or empirically.

However, the disclosure is not limited thereto, and the processor 190 may compare a magnitude of the output signal of the second optical sensor 240, which is identified in the activation of the first light source 210, with a third reference output. The processor 190 may identify whether a magnitude of the output signal of the second optical sensor 240 is less than or equal to the third reference output.

In response to the output of the first optical sensor 230 being greater than or equal to the first reference output (yes in 1040), the filtration apparatus 1 may perform a flow path sterilization operation based on the output of the first optical sensor 230 (1045).

For example, the processor 190 may operate the sterilizing solution generator 94*a* provided on the flow path to sterilize the flow path, and control the valves to allow the liquid to pass through the sterilizing solution generator 94*a* and the flow paths. The sterilizing substances generated by the sterilizing solution generator 94*a* may sterilize the flow path in the sterilization operation. The processor 190 may identify a duration of the sterilization operation based on the output of the first optical sensor 230. In response to the increase of the output of the first optical sensor 230, the duration of the sterilization operation may be increased. Further, in response to the increase of the output of the first optical sensor 230, an interval for performing the sterilization operation may be reduced.

The processor 190 may activate the first light source 210 and receive the output of the first optical sensor 230 based on the completion of the sterilization operation of the flow path. In this case, the processor 190 may control the display 119 to display a message requesting to replace the filter 21 based on the output of the first optical sensor 230 being still greater than or equal to the first reference output. In addition, based on the output of the first optical sensor 230 being still greater than or equal to the first reference output, the processor 190 may transmit a communication signal for displaying the message requesting to replace the filter 21 to a user's user terminal or home appliances.

However, the disclosure is not limited thereto, and in response to the magnitude of the output signal of the second optical sensor 240 being less than or equal to the third reference output, the filtration apparatus 1 may perform the sterilization operation of the flow path, based on the output of the second optical sensor 240. In addition, the processor 190 may control the display 119 to display the message requesting to replace the filter 21 based on the magnitude of the output of the second optical sensor 240 being still less than or equal to the third reference output after the sterilization operation of the flow path. In addition, based on the output of the second optical sensor 240 being still less than or equal to the third reference output, the processor 190 may transmit the communication signal for displaying the message requesting to replace the filter 21 to a user's user terminal or home appliances.

In response to the output of the first optical sensor 230 being less than the first reference output (no in 1040), the filtration apparatus 1 may activate the second light source 220 (1050). Further, after the completion of the sterilization operation, the filtration apparatus 1 may activate the second light source 220.

In order to identify the concentration of the organic and the inorganic substances, the filtration apparatus 1 may activate the second light source 220 in the deactivation of the first light source 210. For example, the processor 190 may control the first light source 210 not to emit UV light and control the second light source 220 to emit visible light or infrared light.

The filtration apparatus 1 may identify the output of the optical sensors 230 and 240 in the activation of the second light source 220 (1060).

The second light source 220 in the activation state may emit visible light or infrared light. In the activation of the second light source 220, the first optical sensor 230 and/or the second optical sensor 240 may directly or indirectly receive the light emitted from the second light source 220. The first optical sensor 230 and/or the second optical sensor 240 may output an electrical signal corresponding to the intensity of the received light.

The processor 190 may identify an output signal of the first optical sensor 230 and/or an output signal of the second optical sensor 240. The output signal of the first optical sensor 230 may correspond to the intensity of light scattered by the organic and inorganic substances contained in the liquid, and the output signal of the second optical sensor 240 may correspond to the intensity of light passing through the organic and inorganic substances included in the liquid.

The filtration apparatus 1 may deactivate the second light source 220 in response to the expiration of a predetermined second time (1070).

The processor 190 may deactivate the second light source 220 to alternately activate the first light source 210 and the second light source 220.

The filtration apparatus 1 may identify whether the output of the first optical sensor 230 is greater than or equal to the second reference output (1080).

For example, the processor 190 may compare a magnitude of the output signal of the first optical sensor 230, which is identified in the activation of the second light source 220, with the second reference output. The second reference output may correspond to the concentration of organic and inorganic substances that can use the liquid for drinking. The second reference output may be set experimentally or empirically.

However, the disclosure is not limited thereto, and the processor 190 may compare a magnitude of the output signal of the second optical sensor 240, which is identified in the activation of the second light source 220, with a fourth reference output. The processor 190 may identify whether a magnitude of the output signal of the second optical sensor 240 is less than or equal to the fourth reference output.

In response to the output of the first optical sensor 230 being greater than or equal to the second reference output (yes in 1080), the filtration apparatus 1 may perform a flow path cleaning operation based on the output of the first optical sensor 230 (1085).

For example, the processor 190 may control the valves to allow the liquid to pass through the filter 21 and the flow paths so as to clean the flow paths. In the cleaning operation, the liquid filtered by the filter 21 may clean the flow paths.

The processor 190 may identify a duration of the cleaning operation based on the output of the first optical sensor 230. In response to the increase of the output of the first optical sensor 230, the duration of the cleaning operation may be increased. Alternatively, in response to the increase of the output of the first optical sensor 230, an interval for performing the cleaning operation may be reduced.

The processor 190 may activate the second light source 220 and receive the output of the first optical sensor 230 based on the completion of the cleaning operation of the flow path. In this case, the processor 190 may control the display 119 to display a message requesting to replace the filter 21 based on the output of the first optical sensor 230 being still greater than or equal to the second reference output. In addition, based on the output of the first optical sensor 230 being still greater than or equal to the second reference output, the processor 190 may transmit a communication signal for displaying the message requesting to replace the filter 21 to a user's user terminal or home appliances.

However, the disclosure is not limited thereto, and in response to the magnitude of the output signal of the second optical sensor 240 being less than or equal to the fourth reference output, the filtration apparatus 1 may perform the cleaning operation of the flow path, based on the output of the second optical sensor 240. In addition, the processor 190 may control the display 119 to display the message requesting to replace the filter 21 based on the magnitude of the output of the second optical sensor 240 being still less than or equal to the fourth reference output after the cleaning operation of the flow path. In addition, based on the output of the second optical sensor 240 being still less than or equal to the fourth reference output, the processor 190 may transmit the communication signal for displaying the message requesting to replace the filter 21 to a user's user terminal or home appliances.

In response to the output of the first optical sensor 230 being less than the second reference output (no in 1080), the filtration apparatus 1 may activate the first light source 210 (1010). Further, after the completion of the cleaning operation, the filtration apparatus 1 may activate the first light source 210.

As described above, the filtration apparatus 1 may identify the concentration of organic substances independently from inorganic substances, and may accurately identify the degree of contamination of the flow path by bacteria.

Accordingly, the filtration apparatus 1 may perform the sterilization operation on the contaminated flow path at an appropriate time.

Figure 17:
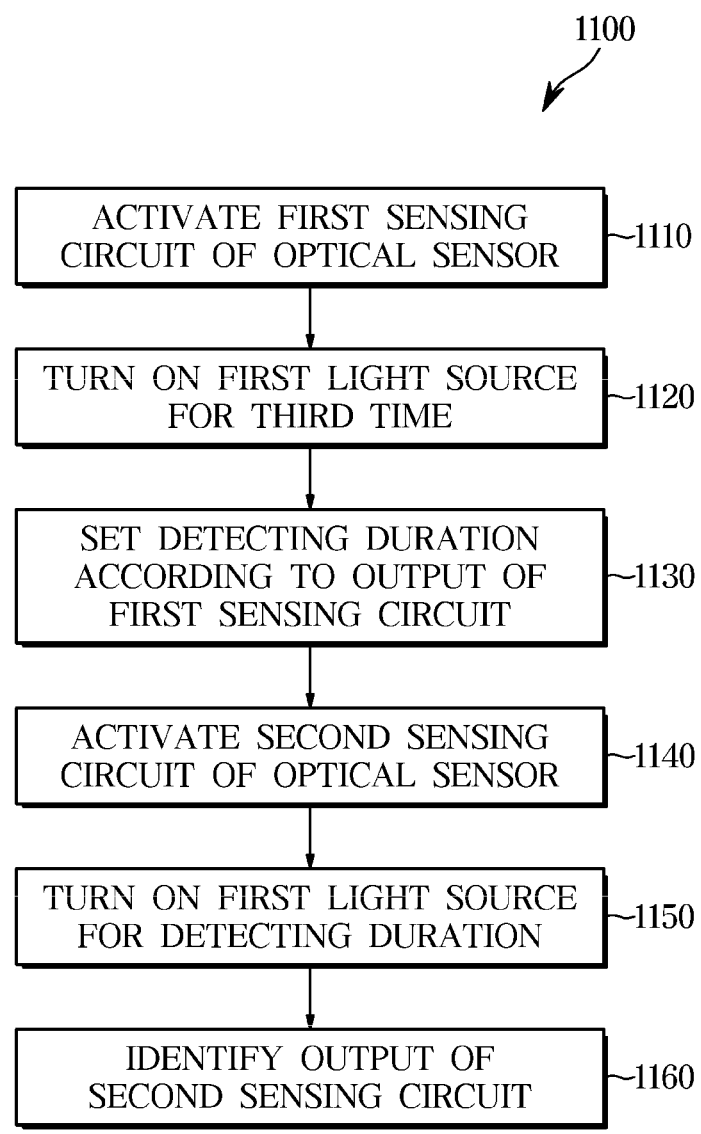
FIG. 17 is a flowchart illustrating a method in which the filtration apparatus according to various embodiments of the disclosure identifies a concentration of organic substances or inorganic substances in the flow path.

FIG. 17 is a flowchart illustrating a method in which the filtration apparatus according to various embodiments of the disclosure identifies a concentration of organic substances or inorganic substances in the flow path.

A method 1100 in which the filtration apparatus 1 identifies the concentration of organic substances or the concentration of inorganic substances in the flow path will be described with reference to FIG. 17.

The filtration apparatus 1 may activate the first sensing circuit 233 of the first optical sensor 230 (1110).

The first optical sensor 230 may include the photodiode 231, the first sensing circuit 233 to identify an instantaneous intensity of light received by the photodiode 231, and the second sensing circuit 234 to identify the accumulated intensity of light received by the photodiode 231.

The processor 190 may activate the first sensing circuit 233 to identify an instantaneous intensity of light in the activation of the first light source 210, for sensing the concentration of the organic substances. For example, the processor 190 may close (turn on) the first switch 236 for activating the first sensing circuit 233.

The filtration apparatus 1 may turn on the first light source 210 for a third time (1120).

In the activation of the first light source 210, the processor 190 may turn on the first light source 210 to emit UV light. While the first light source 210 is turned on, the processor 190 may identify an output signal of the first sensing circuit 233. The first sensing circuit 233 may output an electrical signal corresponding to the instantaneous intensity of the light received by the photodiode 231.

The processor 190 may turn off the first light source 210 in response to the expiration of the third time after turning on the first light source 210.

The filtration apparatus 1 may set the detecting duration according to the output of the first sensing circuit 233 (1130).

The detecting duration may indicate a duration for which the photodiode 231 receives light in order to identify the accumulated intensity of the light received by the photodiode 231. In other words, the photodiode 231 may receive light during the detecting duration, and the intensity of light may be accumulated during the detecting duration.

The processor 190 may set the detecting duration based on the magnitude of the output signal of the first sensing circuit 233. In other words, the detecting duration may vary depending on the output of the first sensing circuit 233. For example, in the response to the increase of the magnitude of the output signal of the first sensing circuit 233, the detecting duration may be reduced, and in response to the decrease of the magnitude of the output signal of the first sensing circuit 233, the detecting duration may be increased.

The filtration apparatus 1 may activate the second sensing circuit 234 of the first optical sensor 230 (1140).

The processor 190 may activate the second sensing circuit 234 to accumulate and measure the intensity of light received by the photodiode 231. For example, the processor 190 may close (turn on) the second switch 238 to activate the second sensing circuit 234.

Further, the processor 190 may deactivate the first sensing circuit 233. For example, the processor 190 may open (turn off) the first switch 236.

The filtration apparatus 1 may turn on the first light source 210 during the detecting duration (1150).

In the activation of the first light source 210, the processor 190 may turn on the first light source 210 to emit UV light. While the first light source 210 is turned on, the processor 190 may identify an output signal of the second sensing circuit 234. The second sensing circuit 234 may output an electrical signal corresponding to the accumulated intensity of the light received by the photodiode 231.

The processor 190 may turn off the first light source 210 in response to the expiration of the detecting duration after turning on the first light source 210. The second sensing circuit 234 may output an electrical signal corresponding to the intensity of light accumulated by the photodiode 231 during the detecting duration.

The filtration apparatus 1 may identify the output of the second sensing circuit 234 of the first optical sensor 230 (1160).

The processor 190 may identify the output of the second sensing circuit 234 corresponding to the concentration of the organic substances included in the liquid passing through the flow path.

For example, the processor 190 may identify the concentration of the organic substances included in the liquid passing through the flow path based on the detecting duration and the magnitude of the output signal of the second sensing circuit 234.

As mentioned above, the filtration apparatus 1 may identify the detecting duration based on the instantaneous output of the first optical sensor 230 and identify the intensity of the light detected by the first optical sensor 230 based on the accumulated output of the first optical sensor 230 accumulated during the detecting duration. Accordingly, the filtration apparatus 1 may improve the sensitivity at which the first optical sensor 230 measures the intensity of light within an appropriate detection range.

As is apparent from the above description, a filtration apparatus may identify a degree of contamination of filtered liquid caused by organic substances and a degree of contamination of filtered liquid caused by inorganic substances.

Further, a filtration apparatus may start cleaning and/or sterilizing a flow path through which water passes, based on a degree of contamination of filtered liquid caused by organic substances and a degree of contamination of filtered liquid caused by inorganic substances.

Further, a filtration apparatus may adjust a duration for cleaning and/or sterilizing a flow path through which liquid passes, based on a degree of contamination of filtered liquid caused by organic substances and a degree of contamination of filtered liquid caused by inorganic substances.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored. For example, there may be a Read Only Memory (ROM), a Random Access Memory (RAM), a magnetic tape, a magnetic disk, a flash memory, and an optical data storage device.

Storage medium readable by machine, may be provided in the form of a non-transitory storage medium. "Non-transitory" means that the storage medium is a tangible device and does not contain a signal (e.g., electromagnetic wave), and this term includes a case in which data is semi-permanently stored in a storage medium and a case in which data is temporarily stored in a storage medium. For example, "non-transitory storage medium" may include a buffer in which data is temporarily stored.

The method according to the various disclosed embodiments may be provided by being included in a computer program product. Computer program products may be traded between sellers and buyers as commodities. Computer program products are distributed in the form of a device-readable storage medium (e.g., compact disc read only memory (CD-ROM)), or are distributed directly or online (e.g., downloaded or uploaded) between two user devices (e.g., smartphones) through an application store (e.g., Play Store™). In the case of online distribution, at least a portion of the computer program product (e.g., downloadable app) may be temporarily stored or created temporarily in a device-readable storage medium such as the manufacturer's server, the application store's server, or the relay server's memory.

Although a few embodiments of the disclosure have been shown and described, it would be appreciated by those skilled in the art that changes may be made in these embodiments without departing from the principles and spirit of the disclosure, the scope of which is defined in the claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A filtration apparatus comprising:
   a flow path;
   a valve provided on the flow path;
   a first light source configured to emit a first light comprising ultraviolet (UV) light toward the flow path;
   a second light source configured to emit a second light comprising visible light or infrared light toward the flow path;
   a first optical sensor located out of a path of the first light and the second light;
   electrodes provided for electrolyzing a liquid to produce a sterilizing solution to be introduced to the flow path; and
   a processor electrically coupled to the valve, the first light source, the second light source, the first optical sensor and the electrodes, and configured to:
      alternately operate the first light source to emit the first light and the second light source to emit the second light,
      receive a first signal from the first optical sensor while the first light source emits the first light, and
      control the valve and the electrodes to produce the sterilizing solution and introduce the sterilizing solution into the flow path based on the first signal,
   wherein the first optical sensor comprises:
      a photodiode;
      a first sensing circuit configured to identify an instantaneous intensity of the first light or the second light based on an output current of the photodiode; and
      a second sensing circuit configured to identify an accumulated intensity of the first light or the second light based on the output current of the photodiode.

2. The filtration apparatus of claim 1, wherein the processor is electrically coupled to the first sensing circuit and the second sensing circuit, and is further configured to alternately activate the first sensing circuit and the second sensing circuit.

3. The filtration apparatus of claim 2, wherein the processor is further configured to:
   identify a detecting duration based on an output of the first sensing circuit,
   control the second sensing circuit to accumulate the output current of the photodiode during the detecting duration; and
   control the valve and the electrodes to produce the sterilizing solution and introduce the sterilizing solution into the flow path based on an output of the second sensing circuit.

4. The filtration apparatus of claim 3, wherein the processor is further configured to reduce the detecting duration based on an increase in a magnitude of the output of the first sensing circuit.

5. The filtration apparatus of claim 1, wherein the first optical sensor comprises:
   an amplifier coupled to a cathode terminal of the photodiode;
   a first switch and a resistor coupled in series between an output terminal and an input terminal of the amplifier; and
   a second switch and a capacitor coupled in series between the output terminal and the input terminal of the amplifier.

6. The filtration apparatus of claim 1, wherein the processor is further configured to control the valve and the electrodes to produce the sterilizing solution and introduce the sterilizing solution into the flow path based on a magnitude of the first signal being greater than or equal to a first reference value.

7. The filtration apparatus of claim 1, wherein the processor is further configured to:

receive a second signal from the first optical sensor while controlling the second light source to emit the second light, and control the valve to clean the flow path based on the second signal.

8. The filtration apparatus of claim 7, wherein the processor is further configured to control the valve to clean the flow path based on a magnitude of the second signal being greater than or equal to a second reference value.

9. The filtration apparatus of claim 1, further comprising a second optical sensor located on a path of the first light and the second light, wherein the processor is further configured to:
receive a third signal from the second optical sensor while controlling the second light source to emit the second light, and
control the valve to clean the flow path based on the third signal.

10. The filtration apparatus of claim 9, wherein the processor is further configured to control the valve to clean the flow path based on a magnitude of the third signal being less than or equal to a third reference value.

11. The filtration apparatus of claim 1, further a filter provided through which the flow path passes,
wherein the first light source, the second light source, and the first optical sensor are provided downstream of the filter.

12. A control method of a filtration apparatus comprising a flow path; a valve provided on the flow path; and electrodes configured to produce a sterilizing solution and introduce the sterilizing solution into on the flow path, the control method thereof comprising:
alternately operating a first light source configured to emit a first light comprising ultraviolet (UV) light toward the flow path and a second light source configured to emit a second light comprising visible light or infrared light toward the flow path;
identifying a first signal corresponding an intensity of light received by a first optical sensor while the first light source emits the first light; and
controlling the valve and the electrodes to produce the sterilizing solution and introduce the sterilizing solution into the flow path based on the first signal,
wherein the first optical sensor comprises:
a photodiode;
a first sensing circuit configured to identify an instantaneous intensity of the first light or the second light based on an output current of the photodiode; and
a second sensing circuit configured to identify an accumulated intensity of the first light or the second light based on the output current of the photodiode.

13. The control method of claim 12, wherein the operating of the first light source comprises alternately activating the first sensing circuit.

14. The control method of claim 13, wherein:
the operating of the first sensing circuit comprises identifying a detecting duration based on an output of the first sensing circuit; and
the operating of the second sensing circuit comprises:
accumulating the output current of the photodiode during the detecting duration, by the second sensing circuit; and controlling the valve and the electrodes to produce the sterilizing solution and introduce the sterilizing solution into the flow path based on an output of the second sensing circuit.

15. The control method of claim 14, wherein the detecting duration is reduced based on an increase in a magnitude of the output of the first sensing circuit.

16. The control method of claim 12, wherein the operating of the first light source comprises controlling the valve and the electrodes to produce the sterilizing solution and introduce the sterilizing solution into the flow path based on a magnitude of the first signal being greater than or equal to a first reference value.

17. A filtration apparatus comprising:
a flow path;
a filter provided on the flow path;
at least one valve provided on the flow path;
an electrolysis device configured to produce a sterilizing solution and introduce the sterilizing solution into on the flow path;
a first light source configured to emit a first light comprising ultraviolet (UV) light;
a second light source configured to emit a second light comprising visible light or infrared light;
a first optical sensor located on a path of the first light and the second light; and
a processor electrically coupled to the at least one valve, the electrolysis device, the first light source, the second light source, and the first optical sensor,
wherein the processor is configured to:
receive a first signal from the first optical sensor while the first light source emits the first light,
control the at least one valve and the electrolysis device to produce the sterilizing solution and introduce the sterilizing solution into the flow path based on a magnitude of the first signal being equal to or less than a first reference value,
receive a second signal from the first optical sensor while the second light source emits the second light, and
control the at least one valve to clean the flow path based on a magnitude of the second signal being equal to or less than a second reference value.

18. The filtration apparatus of claim 17, further comprising a display,
wherein the processor is further configured to:
receive a third signal from the first optical sensor while the first light source emits the first light after sterilizing the flow path, and
control the display to display a message requesting to replace the filter based on a magnitude of the third signal being equal to or less than the first reference value.

19. The filtration apparatus of claim 17, further comprising a display,
wherein the processor is configured to:
receive a fourth signal from the first optical sensor while the second light source emits the second light after cleaning the flow path, and
control the display to display a message requesting to replace the filter based on a magnitude of the fourth signal being equal to or less than the second reference value.

* * * * *